United States Patent
Kawabe et al.

(10) Patent No.: US 10,035,887 B2
(45) Date of Patent: Jul. 31, 2018

(54) MANUFACTURING METHOD FOR NANOPARTICLE

(71) Applicant: SHIMADZU CORPORATION, Kyoto (JP)

(72) Inventors: Takashi Kawabe, Kyoto (JP); Elichi Ozeki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 91 days.

(21) Appl. No.: 14/830,187

(22) Filed: Aug. 19, 2015

(65) Prior Publication Data
US 2017/0050341 A1    Feb. 23, 2017

(51) Int. Cl.
| | |
|---|---|
| *C08J 3/12* | (2006.01) |
| *B01J 19/00* | (2006.01) |
| *B01F 13/00* | (2006.01) |
| *A61K 9/16* | (2006.01) |
| *B82Y 40/00* | (2011.01) |
| *B01J 2/06* | (2006.01) |

(52) U.S. Cl.
CPC ............ *C08J 3/12* (2013.01); *B01F 13/0062* (2013.01); *B01J 19/0093* (2013.01); *B82Y 40/00* (2013.01); *B01J 2/06* (2013.01)

(58) Field of Classification Search
None
See application file for complete search history.

(56) References Cited

U.S. PATENT DOCUMENTS

| | | | | |
|---|---|---|---|---|
| 5,858,195 A | * | 1/1999 | Ramsey | B01F 13/0076 204/450 |
| 6,168,733 B1 | * | 1/2001 | Naylor | B01J 2/06 264/14 |
| 8,114,319 B2 | * | 2/2012 | Davis | B01F 5/0646 264/11 |

(Continued)

FOREIGN PATENT DOCUMENTS

| | | |
|---|---|---|
| JP | H11-335267 | 12/1999 |
| JP | 2001-226294 | 8/2001 |

(Continued)

OTHER PUBLICATIONS

Near-infrared fluorescence tumor imaging . . . , by Akira Makino, et al., 0142-9612/$-see front matter © 2009 Elsevier Ltd., doi:10.1016/j.Biomaterials 2009.05.046, vol. 30, p. 5156-5160.

*Primary Examiner* — Mary Lynn F Theisen
(74) *Attorney, Agent, or Firm* — Andrew F. Young, Esq.; Lackenbach Siegel, LLP

(57) ABSTRACT

A manufacturing method for nanoparticles including an amphiphilic block polymer having a uniform particle diameters has steps of forming a laminar flow of polymer solution by inducing a solution comprising an amphiphilic block polymer having a hydrophilic block and a hydrophobic block in an organic solvent into a polymer solution supply flow passage, a step of forming at least two laminar flows of a water system solution by inducing the water system solution to at least two water system solution supply passages, and a step of forming nanoparticles comprising the amphiphilic block polymer by making a confluence as if at least two laminar flows of water system solution sandwich the laminar flow of the polymer solution.

17 Claims, 10 Drawing Sheets

(56) References Cited

U.S. PATENT DOCUMENTS

| | | | | |
|---|---|---|---|---|
| 8,911,864 B1* | 12/2014 | Petsev | ................... | C01B 33/18 427/212 |
| 9,259,701 B2* | 2/2016 | Palmer | ................... | B01J 2/08 |
| 2003/0201022 A1* | 10/2003 | Kawai | ................... | B01D 11/04 137/828 |
| 2007/0028969 A1* | 2/2007 | Boyd | ................... | B01F 13/0059 137/606 |
| 2007/0054119 A1* | 3/2007 | Garstecki | ............ | B01J 19/0093 428/402 |
| 2008/0019908 A1 | 1/2008 | Akitsu et al. | | |
| 2008/0067128 A1* | 3/2008 | Hoyos | ............... | B01L 3/502761 210/658 |
| 2009/0114285 A1* | 5/2009 | Hashimoto | ............ | B01F 5/064 137/13 |
| 2009/0197977 A1* | 8/2009 | Haeberle | ............ | B01F 3/04446 516/10 |
| 2010/0184928 A1* | 7/2010 | Kumacheva | ......... | B01F 3/0807 526/65 |
| 2010/0188466 A1* | 7/2010 | Clarke | ................. | B05B 7/0408 347/75 |
| 2011/0256529 A1* | 10/2011 | Daniels | ................. | B01J 2/06 435/6.1 |
| 2013/0046030 A1* | 2/2013 | Rotem | ................. | B01F 3/0807 516/21 |
| 2013/0119570 A1* | 5/2013 | Sugiura | ................. | B01F 3/0807 264/5 |
| 2014/0127132 A1* | 5/2014 | Ozeki | ................. | A61K 9/1075 424/9.1 |
| 2014/0134623 A1* | 5/2014 | Hiddessen | ............... | G01N 1/38 435/6.12 |
| 2015/0125400 A1* | 5/2015 | van Hoeve | ......... | B01J 19/0093 424/9.52 |
| 2017/0151536 A1* | 6/2017 | Weitz | ................. | B01F 13/0062 |

FOREIGN PATENT DOCUMENTS

| | | | |
|---|---|---|---|
| JP | 2003-26812 | | 1/2003 |
| JP | 2008-24816 | | 2/2008 |
| JP | 2009-256324 | | 11/2009 |
| JP | 2012-170861 | | 9/2012 |
| JP | 2012-213747 | | 11/2012 |
| JP | 2014-15655 | * | 8/2014 |
| WO | WO 2009/148121 | | 12/2009 |
| WO | WO 2012/176885 | | 2/2015 |

\* cited by examiner

Micro Flow Cell

Polymer concentration
C: 8 mg/mL

FRR: 9

Temperature: 25 °C

Micro Flow Cell

Polymer concentration
C: 8 mg/mL

FRR: 9

Temperature: 25 °C

Micro Flow Cell

Polymer concentration
C: 8 mg/mL

FRR: 9

Temperature: 25 °C

Micro Flow Cell

Polymer concentration
C: 8 mg/mL

FRR: 9

Temperature: 25 °C

MANUFACTURING METHOD FOR NANOPARTICLE

CROSS REFERENCE TO RELATED APPLICATION

This application relates to, but does not claim priority from, JP App. Ser. No. 2013-28491 filed Feb. 17, 2013, the entire contents of which are incorporated herein by reference.

FIGURE SELECTED FOR PUBLICATION

FIG. 1

BACKGROUND OF THE INVENTION

Field of the Invention

The present invention relates to supermolecular chemistry, medicine, technology and pharmacology alliance area and nano-medicine. The present invention further relates to a manufacturing method for a nanoparticle comprising an amphiphilic block polymer, and further specifically relates to the nanopolymer comprising the amphiphilic block polymer using a novel combinatorial structure made from polymer solution and an aqueous solution. Even more particularly, the present invention provides for a continuous manufacture method and system of nanoparticles having a homogeneous particle diameter comprising a block polymer having a superior biocompatibility. In addition, the present invention also relates to a micro flow cell and system that can be used for the continuous manufacture of the nanoparticles.

Description of the Related Art

Technical Background

A molecular imaging technology is being developed to diagnose a tumor and other diseases. The molecular imaging technology may include Positron Emission Tomography (PET), Single Photon Emission Computed Tomography (SPECT), Magnetic Resonance Imaging (MRI) and Fluorometric Imaging and so forth. An adequate probe for each diagnosis, having high sensitivity, i.e., high integration selectivity for a lesion, and low invasiveness, is being sought.

On the other hand, relative to a medical treatment, a cancer chemotherapy using an anti-tumor agent during a prognosis of an early stage treatment, a surgical treatment and radiotherapy, is conducted to prevent a cancer metastasis. An anticancer agent may also seriously damage a normal tissue and accordingly, an adverse reaction is concern. A variety of drug delivery systems (DDS) have been developed to reduce the severity of adverse reaction. As one of them, DDS utilizing nanoparticles as a carrier utilizing Enhanced Permeability and Retention Effect (EPR Effect), a characteristics of angiogenesis, observed remarkably at the initial proliferation stage of tumor is noticed and a variety of nanoparticles have been studied. ERP effect is set forth as a phenomenon in which several tens of nm to several hundreds of nm (e.g., around 20-200 nm) nanoparticles administered into blood vessels drain from the blood capillary system in which permeability is abnormally enhanced, and accumulate in the interstitial space of rapidly proliferating tumor tissues because of partial contribution of immature lymph channel.

JPH11-335267A, JP2003-26812A, and JP2001-226294 disclose the manufacturing method for polymer micelles containing poorly-water soluble pharmaceutical substance, and the entire contents of each of which are incorporated herein by reference. According to JP2001-226294, the manufacturing method for polymer micelles enclosing a poorly-water soluble pharmaceutical substance is disclosed, wherein an organic solution is prepared by dissolving a poorly-water soluble pharmaceutical substance and a block co-polymer including hydrophilic segment and hydrophobic segment in water immiscible organic solvent; the obtained organic solution is mixed with aqueous vehicle to provide an oil-in-water emulsion; the polymer micelles enclosing the pharmaceutical substance is formed by evaporating the organic solvent from the obtained emulsion; and if necessary, the obtained polymer micelle solution is subjected to sonication and ultrafiltration. However, according to the same Patent Document, the organic solvent is removed by a dialysis process and then the particles are pulverized by a sonication process (i.e., top-down process) so that the process can be complicated. Further, pulverization of particles by the sonication process is difficult to provide precious control of the particle size. In addition, once prepared particles are broken down by the sonication process so that the content inside the particle might leak and the inclusion quantity of the pharmaceutical substance might be out of control.

JP2012-213747A, the contents of which are fully incorporated by reference, discloses a fine particle manufacturing apparatus comprising; a pressurizing module that presses a flow passage member having fine flow passage of 50-30 μm in diameter and starting material solution in which particles are dispersed or dissolved and transports to the flow passage member under pressure, and a vacuum drying chamber to receive and dry the staring material solution passed through the flow passage member. The fine particle manufacturing apparatus disclosed in the same Patent Document transports under pressure and pulverizes the already formed particles (i.e., top-down system).

JP2005-246227A, the contents of which are fully incorporated by reference, discloses the manufacturing method for a leuco dye inclusion microcapsule that contains air bubbles and can be broken down by sonication or pressure. The particle diameter that is manufactured is micrometer in size and large (e.g., 4 μm [0021] in Example 1 and 6 μm [0033] in Example 3). The large particles are pulverized into micrometer size particles by using a homogenizer, i.e., top-down system, so that the inclusion quantity control of leuco dye in the microcapsule might be difficult.

JP2009-256324A, the contents of which are fully incorporated by reference, discloses the manufacturing method for fine particles containing a biologically active substance, wherein the step that prepares an emulsion by mixing the volatile organic acid aqueous solution containing the biologically active substance or volatile organic acid solution containing the biologically active substance and volatile organic acid solvent containing biodegradable polymers and the step that the obtained emulsion is mixed with aqueous polymer solution having negative charge are included. The particle diameter of fine particles has not been disclosed.

JP2012-170861A, the contents of which are fully incorporated by reference, discloses the synthesis method for non-sphere hydrogel particles, wherein; relative to an flow passage structure X comprising at least two inlets I1-In (n≥2), at least one outlet O, inlet flow passages C1-Cn respectively connected to the I1-In, a flow passage J that is formed by that the inlet flow passage C1-Cn is flowing into each other at the same time or step-by-step and connected to outlet; a gel solution Z that is a starting material for the hydrogel is induced from the inlet I1 and the gelling agent solution G from the inlet I2 are induced respectively and continuously, a fiber in which gel solution Z is at least even part turned into gel in the flow passage J is formed, and further the fiber is cut by enclosing the fiber, for which the gel solution Z is at least partially turned into gel in the inside or outside of the flow passage X, into the droplet, by which non-sphere hydro gel is prepared. The same Patent Document disclose that gel solution Z and gelling agent solution are continuously induced together and the fiber that the gel solution is turned into a gel is formed at the flow passage J after flowing into each other. The fiber is cut by enclosing the fiber formed by gelation to produce non-sphere hydrogel. The same Patent Document disclose no amphiphilic block polymers and further the produced hydrogel particle is very large, wherein the size thereof is from several μm to several cm in diameter.

Nanoparticles applied to DDS is disclosed in, e.g., JP2008-24816A (US2008/0019908), the contents of which are fully incorporated by reference, that an amphiphilic block polymer comprises a hydrophilic block and a hydrophobic block, wherein the hydrophilic block is a hydrophilic polypeptide chain having 10 or more sarcosine units and the hydrophobic block is a hydrophobic molecular chain comprising units selected from the group consisting of amino acid units and hydroxyl acid units as essential structural units, and the amphiphilic block polymer is an hydrophobic molecular chain having 5 or more the essential structure units, and the molecular assembly having 10-500 nm in diameter comprises the amphiphilic block polymer.

PCT/WO2009/148121 and Biomaterials, 2009, Vol. 30, p. 5156-5160, the contents of each of which are fully incorporated by reference, disclose that linear amphiphilic block polymers having a polylactic acid chain as the hydrophobic block and the polysarcosine chain as the hydrophilic block are self-assembled in the aqueous solution to form high molecular micelles (lactosome) that are larger than 30 nm in particle diameter lactosome is highly long-lasing in blood and it is reported that the integrated amount in liver is extremely low compared to the already developed high molecular micelles. lactosome can be applied as a nanocarrier for molecular imaging targeting tumor tissues or for drug delivery by utilizing the EPR effect (property of nanoparticles in blood having tens to hundreds nm particle diameter tend to accumulate in tumor tissue).

PCT/WO2012/176885, the contents of which are fully incorporated by reference, discloses that branched amphiphilic block polymers having the branched hydrophilic block having sarcosine and the hydrophobic block having a polylactic acid are self-assembled in the aqueous solution to form high molecular micelles (lactosome) having 10-50 nm particle diameter.

PRIOR ART DOCUMENTS

Patent Document

Patent Document 1: JP Patent Published H11-335267
Patent Document 2: JP Patent Published 2003-26812
Patent Document 3: JP Patent Published 2001-226294
Patent Document 4: JP Patent Published 2012-213747
Patent Document 5: JP Patent Published 2005-246227
Patent Document 6: JP Patent Published 2009-256324
Patent Document 7: JP Patent Published 2012-170861
Patent Document 8: JP Patent Published 2008-24816
Patent Document 9: US2008/0019908
Patent Document 10: WO2009/148121
Patent Document 11: WO2012/176885

Non-Patent Document

Non-Patent Document: Biomaterials, 2009, Vol. 30, Page 5156-5160Q

ASPECTS AND SUMMARY OF THE INVENTION

Problems to be Solved by the Invention

According to WO2009/148121 and WO2012/176885, nanoparticles are produced from amphiphilic block polymers by a film method. The film method comprises the following steps. Specifically, the steps comprises the step of preparing a solution comprising amphiphilic block polymers in an organic solvent in the vessel (e.g., glass container), the step of obtaining a film having amphiphilic block polymer on the inside wall of the vessel by removing the organic solvent from the solution, and the step of obtaining a molecular dispersion solution of the molecular assembly by converting the film-like material to particles of molecular assembly by means of a sonication process, and sonication devices are recognized by those of skill in the art. Further, the film method may further include the step of freeze-drying the dispersion solution of the molecular assembly. The film method is a batch-wise system so that the method cannot be preferred from productivity standpoints and may be inadequate to control the particle diameter thereof between batches.

Further, WO2009/148121 and WO2012/176885 does not disclose, whether actually conducted or not, but an injection method to produce nanoparticles is disclosed ([0145] in WO2009/148121 and [0088] in WO2012/176885). The injection method comprises the following steps. Specifically, the steps comprises the step of preparing a solution comprising amphiphilic block polymers in an organic solvent in the vessel (e.g., test tube), the step of dispersing the solution into water or an aqueous solution, and step of removing the organic solvent. Further, the injection method may include the step of purifying process arbitrarily prior to the step of removing the organic solvent. The injection method is a batch-wise system so that the method cannot be preferred from productivity standpoints and may be inadequate to control the particle diameter thereof between batches.

Further, on the other hand, it is expected to prepare nanoparticles having a uniform particle diameter in the range of 20-200 nm to provide the desired EPR Effect.

The purpose of the present invention is to provide a manufacturing method for nanoparticles comprising amphiphilic block polymer having a uniform particle diameter.

Means for Solving the Problem

The inventors of the present invention extensively studied to complete the present invention to provide a continuous production of nanoparticles comprising an amphiphilic block polymer having a uniform particle diameter approximately in the range of 20-200 nm by forming a laminar flow of amphiphilic block polymer having a hydrophilic block and a hydrophobic block and at least two laminar flows of water system solution and making confluent as if at least two laminar flows of water system solution sandwich a laminar flow of the polymer solution.

The present invention comprises the following alternative inventions.

(1) A manufacturing method for nanoparticles comprising an amphiphilic block polymer having a hydrophilic block and a hydrophobic block comprising: a step of forming a laminar flow of polymer solution by inducing a solution comprising amphiphilic block polymer having a hydrophilic block and hydrophobic block in an organic solvent into a polymer solution supply flow passage, a step of forming at least two laminar flows of the water system solution by inducing the water system solution to at least two water system supply flow passages, and a step of forming nanoparticles comprising the amphiphilic block polymer by making a confluent laminar flow, wherein at least the two laminar flows of water system solution sandwich the laminar flow of the polymer solution.

(2) A manufacturing method of nanoparticles according to Claim 1 comprising: a step of using a micro flow cell comprising a polymer solution inlet, the polymer solution supply flow passage connected to the polymer inlet, at least two water system solution inlets, at least two water system solution supply flow passages connected to each said water system solution inlet, and a confluent section, wherein the polymer solution supply flow passage and at least two water system solution supply flow passages are confluent, and further comprising; a nanoparticle forming flow passage in place in the downstream side of said confluent section, and a nanoparticle inclusion solution outlet at the downstream end of said nanoparticle forming flow passage, wherein the confluent section is in place and formed as if at least two water system solution supply flow passages sandwich the polymer solution supply flow passage, and further comprising a step of inducing the amphiphilic block polymer inclusion solution from the polymer solution inlet and providing the laminar flow of the polymer solution to the confluent section through the polymer solution supply flow passage, and also a step of inducing water system solution from at least two water system solution inlets and providing the two laminar flows of the water system solution to the confluent section through at least two water system supply flow passages, a step of forming nanoparticles comprising amphiphilic block polymer while contacting the laminar flow of the polymer solution and the laminar flow of the water system solution each other toward the downstream of the nanoparticle forming flow passage from the confluent section, and a step of obtaining a solution containing the formed nanoparticles from the nanoparticles inclusion solution outlet.

(3) A manufacturing method for nanoparticles according to the above (2), wherein the micro flow cell comprises; a substrate, a resin film that is in-place on the substrate, wherein the polymer solution supply flow passage, at least two water system solution supply flow passage, the confluent section and the nanoparticle formation flow passage are formed, a cover sheet that is in-place on the resin film, wherein the polymer solution inlet is formed at the position corresponding to the upperstream end of the polymer solution supply flow passage, at least two water system solution inlets are formed at the position corresponding to each upperstream end of the two water system solution supply flow passages, and the nanoparticles inclusion solution outlet is formed at the position corresponding to the downstream end of the nanoparticle formation flow passage, wherein the substrate and the resin film, and resin film and the cover sheet are connected in the liquid-tight state.

(4) A manufacturing method for nanoparticles according to the above inventions (2) or (3), wherein the confluent section of the micro flow cell is formed in place the two water system solution supply flow passages relative to the polymer solution supply flow passage as if the laminar flows of water system solution sandwich the laminar flow of polymer solution from both right side and left side relative the flow direction of the polymer solution toward downstream side from the upperstream side at the downstream end of the polymer solution supply flow passage.

(5) A manufacturing method for nanoparticles according to one of the above inventions (1)-(4), wherein the amphiphilic block polymer comprises a hydrophilic block having alkylene oxide unit and/or sarcosine unit and a hydrophobic block having hydroxy acid unit.

(6) A manufacturing method for nanoparticles according to one of the above inventions (1)-(5), wherein the amphiphilic block polymer comprises a hydrophilic block having sarcosine unit and a hydrophobic block having lactic acid unit.

(7) A manufacturing method for nanoparticles according to one of the above inventions (6), wherein the total sarcosine units included in the hydrophilic block is in the range of 2-300.

(8) A manufacturing method for nanoparticles according to one of the above (6) or (7), wherein the total lactic acid units included in the hydrophobic block is in the range of 5-400.

(9) A manufacturing method for nanoparticles according to one of the above (1)-(8), wherein a particle diameter of the formed nanoparticles is in the range of 10-200 nm.

(10) A manufacturing method for nanoparticles according to one of the above (1)-(9), wherein particle size distribution relative to the formed nanoparticles provides a single peak property.

(11) A manufacturing method for nanoparticles according to one of the above (1)-(10), wherein nanoparticles containing a pharmaceutical agent and/or a labeling agent can be obtained by inclusion of the pharmaceutical agent and/or a labeling agent in the polymer solution.

(12) A manufacturing method for nanoparticles according to one of the above (1)-(11), wherein nanoparticles containing a pharmaceutical agent and/or a labeling agent can be obtained by inclusion of the pharmaceutical agent and/or a labeling agent in the water system solution.

(13) A micro flow cell to manufacture nanoparticles comprising an amphiphilic block polymer having a hydrophilic block and a hydrophobic block comprising: at least one polymer solution inlet, at least one polymer solution supply flow passage connected to the polymer solution inlet, at least two water system solution inlets, at least two water system solution supply flow passages connected respectively to the water system solution inlet, and a confluent section, wherein the polymer solution supply flow passage and at least two water system solution supply flow passages are confluent, and further comprising; a nanoparticle forming flow passage in place in the downstream side of the confluent section, and a nanoparticle inclusion solution outlet at the downstream end of the nanoparticle forming flow passage, wherein: the confluent section is formed in place as if at least two water system solution supply flow passages sandwich the polymer solution supply flow passage.

The micro flow cell to manufacture the above nanoparticles comprises; a substrate, a resin film that is in-place on the substrate, wherein the polymer solution supply flow passage, at least two water system solution supply flow passage, the confluent section and the nanoparticle formation flow passage are formed, a cover sheet that is in-place on the resin film, wherein the polymer solution inlet is formed at the position corresponding to the upstream end of the polymer solution supply flow passage, at least two water system solution inlets are formed at the position corresponding to each upstream end of the two water system solution supply flow passages, and the nanoparticles inclusion solution outlet is formed at the position corresponding to the downstream end of the nanoparticle formation flow passage, wherein the substrate and the resin film, and resin film and the cover sheet are connected in the liquid-tight state.

According to another alternative aspect of the present invention, a micro flow cell system that is for manufacturing the above nanoparticles is provided wherein the micro flow cell confluent section is formed by positioning the two water system solution supply flow passage relative to the polymer solution supply flow passage as if the laminar flows of water system solution sandwich the laminar flow of polymer solution from both right side and left side relative the flow direction of the polymer solution toward downstream side from upstream side at the downstream end of the polymer solution supply flow passage.

A particle diameter control method for nanoparticles comprising an amphiphilic block polymer having an hydrophilic block and a hydrophobic block comprising: a step of forming a laminar flow of polymer solution by inducing a solution comprising amphiphilic block polymer having a hydrophilic block and a hydrophobic block in an organic solvent into a polymer solution supply flow passage, a step of forming at least two laminar flows of water system solution by inducing water system solution to at least two water system supply flow passages, and a step of forming nanoparticles comprising amphiphilic block polymer by making confluent section as if at least two laminar flows of water system solution sandwich the laminar flow of polymer solution.

Effects of the Invention

According to the present invention, a laminar flow of an amphiphilic block polymer having a hydrophilic block and a hydrophobic block and at least two laminar flows of water system solution are formed and nanoparticles comprising the amphiphilic block polymer is formed by making confluence as if at least two laminar flow of water system solution sandwich and enrobe and surround and bound the laminar flow of the polymer solution.

The laminar flows of water system solution sandwich the laminar flow of polymer solution from both right side and left side relative to the flow direction of the polymer solution toward downstream side from the upstream side at the confluent section (i.e., the downstream end of the polymer solution supply flow passage). Accordingly, the laminar flow of the polymer solution flows at the center of the flow passage and the laminar flow of the water system solution flows proximate the inner periphery of the flow passage (contact area to the inside wall of the flow passage) toward the nanoparticle forming flow passage from the confluent section (the upstream area of the nanoparticle forming flow passage). The flow rate of the laminar flow of the polymer solution increases because of running in the center of the flow passage so that the area of the liquid-liquid boundary face in between the laminar flow of the water system solution surrounding the laminar flow of the polymer solution may increase. It is considered that the self-assembly of the amphiphilic block polymer may take place mainly in the liquid-liquid boundary face. The self-assembly of the amphiphilic block polymer is enhanced by an increase of the area of the liquid-liquid boundary face at the confluent section and an increase of the flow rate of the laminar flow of the polymer solution and nanoparticles having a uniform particle diameter approximately in the range of 20-200 nm are formed (i.e., the particle distribution provides a single peak property).

According to the manufacturing method of the present invention, nanoparticles comprising the amphiphilic block polymer have a uniform particle diameter approximately in the range of 20-200 nm so that an expected EPR Effect can be obtained. Accordingly, if the nanoparticles are formulated in a labeling agent, a useful molecular probe for a molecular imaging system can be provided. Further, if the nanoparticles are formulated in a pharmaceutical substance, a useful carrier for DDS can be provided.

Further, according to the present invention, nanoparticles comprising an amphiphilic block polymer can be continuously produced. A continuous production may provide a superior production efficiency and no irregularity between batches so that nanoparticles having uniform particle diameter can be stably provided.

Further, according to the present invention, a particle diameter of a nanoparticle can be controlled by changing the flow rates of the laminar flow of the amphiphilic block polymer and the laminar flow of the water system solution.

The above and other aspects, features and advantages of the present invention will become apparent from the following description read in conjunction with the accompanying drawings, in which like reference numerals designate the same elements.

BRIEF DESCRIPTION OF THE DRAWINGS

FIG. 9(A) is basically the same as illustrated in FIG. 1

FIG. 10(A) is basically the same as illustrated in FIG. 6

DETAILED DESCRIPTION OF THE PREFERRED EMBODIMENTS

Figure 1:
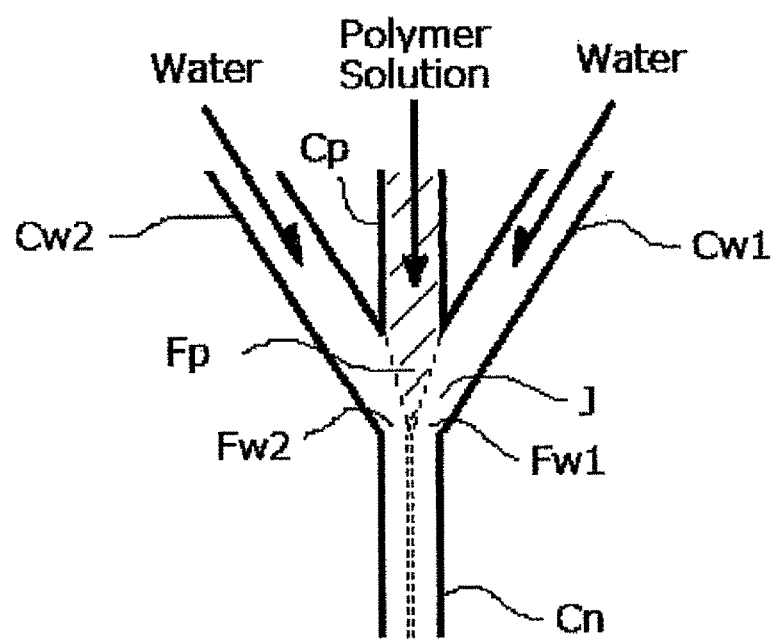
FIG. 1 is a schematic plan view illustrating a confluent mode of a laminar flow of an amphiphilic block polymer and a laminar flow of a water system solution according to one aspect of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations or steps or constructions in turn, in a manner that may be helpful in understanding embodiments of the present invention; however, the order of description should not be construed to imply that these operations are order dependent.

The Best Mode of Embodiment of the Present Invention

1. Amphiphilic Block Polymer

According to the present invention, if an amphiphilic block polymer comprising a hydrophilic block and a hydrophobic block self-assembles by contacting a water system solution (water or an aqueous solution) and then forms a nanoparticle, the use thereof is not particularly limited. A nanoparticle is a nanometer size particle and may include a molecular assembly such as a micelle and a vesicle and so forth.

The amphiphilic block polymer that comprises a hydrophilic block having an alkylene oxide unit and/or sarcosine unit and a hydrophobic block having hydroxy acid unit can be used. An alkylene oxide unit may include ethylene oxide unit and propylene oxide unit and so forth. In the case of ethylene oxide unit, the hydrophilic block includes PEG chain. A hydroxy acid unit may include glycolic acid, lactic acid. hydroxybutyric acid and so forth.

Next, as an example of an amphiphilic block polymer, the amphiphilic block polymer comprising a hydrophilic block having sarcosine unit and a hydrophobic block having lactic acid unit is set forth. The amphiphilic block polymer may be either linear type or branch type. The hydrophilic block and the hydrophobic block are connected through a linker element.

1-1. Hydrophilic Block

According to the present invention, a physical property of "hydrophilicity" that belongs to the hydrophilic block of the amphiphilic block polymer is not particularly limited to a specific level, but it means that at least the entirety of the hydrophilic block provides relatively stronger hydrophilicity compared to the lactic acid chain of the hydrophobic block later set forth. Or it means that the hydrophilicity is in the certain level at which the entirety of polymer molecule formed by co-polymerization of the hydrophilic block and the hydrophobic block allows providing an amphiphilicity in reality. Further, or, it means that the hydrophilicity is in the certain level at which the amphiphilic block polymer can self-assemble and allows forming the self-assembly, particularly the particle-like self-assembly.

According to the present invention, the hydrophilic block of the amphiphilic block polymer may have either a linear chain structure or a branched chain structure. In the case of the branched structure, each branch of the hydrophilic block should include sarcosine.

A person skilled in the art can decide arbitrarily the kind and ratio of the structure unit relative to the hydrophilic block as if the entirety of the block is hydrophilic as set forth above. For example, the total sarcosine units included in the hydrophilic block is in the range of 2-300. Specifically, in the case of a linear chain type, the total sarcosine unit can be, for example, approximately in the range of 10-300, 20-200, or 20-100. If the structure unit number is over the above range and then molecular assembly is formed, the formed molecular assembly tends to be less stable. If the structure unit number is less than the above range, the amphiphilic block polymer does not work or it tends that the formation of the molecular assembly per se might be difficult.

In the case of a branched chain type, the total sarcosine unit in all branches can be, for example, in the range of 2-200, 2-100 or 2-10. Or, in the case of a branched chain type, the total sarcosine unit included in a plurality of hydrophilic block can be, for example, in the range of 30-200 or 50-100. Average sarcosine unit number per branch can be, for example, 1-60, 1-30, 1-10, or 1-6. Specifically, each amphiphilic block polymer can comprise sarcosine or polysarcosine chain. If the structure unit number is over the above range and then molecular assembly is formed, the formed molecular assembly tends to be less stable. If the structure unit number is less than the above range, the amphiphilic block polymer does not work or it tends that the formation of the molecular assembly per se might be difficult.

In the case of a branched type, two and more branches relative to the hydrophilic block are preferable, but three and more is further preferable in the light of obtaining efficiently particle like micelles upon forming the molecular assembly. A maximum number of branches relative to the amphiphilic block polymer is not particularly limited but it may be 27, for example. Particularly, in the present invention, the number of branches of the amphiphilic block polymer is preferably 3. A person killed in the art can arbitrarily design the branched structure.

Sarcosine (i.e., N-methylglycine) is highly water soluble and N-substituted amide of a polymer of sarcosine can be subjected to cis-trans isomerization compared to the normal amide group and the steric hindrance around Cα-carbon is less so that the polymer may have high flexibility. In the case of using such structure as a constitution block, a basic property having high hydrophilicity or a basic property having high hydrophilicity and high flexibility together is provided to the block so that it can be very useful.

Further, it is preferable that the hydrophilic block comprises a hydrophilic group (e.g., represented by hydroxy group) at the end (i.e., the opposite end of the linker element).

Further, relative to polysarcosine chain, all sarcosine units can be either sequential or non-sequential, but the molecular design as the entirety of the peptide chains might not damage the above basic properties is preferable.

1-2. Hydrophobic Block

According to the present invention, a physical property of "hydrophobicity" that belongs to the hydrophobic block is not particularly limited to a specific level, but the level should provide hydrophobicity as at least the hydrophobic block provides relatively stronger hydrophobicity compared to the entirety of the hydrophilic block and forms a copolymer with the hydrophilic block so that the entirety of the copolymer may bring the amphiphilicity in reality. Or, the hydrophobicity may be in the certain level at which the amphiphilic block polymer can self-assemble and allows forming the self-assembly, preferably the particle-like self-assembly.

The hydrophobic block of one amphiphilic block polymer may be either not-branched or branched. However, it is considered that if the hydrophobic block is not branched, the density of the hydrophilicity branch type shell element increases relative to the hydrophobicity core element so that stable core/shell type molecular assembly having small particle diameter may be easily formed.

According to the present invention, the hydrophobic block includes polylactic acid chain (PLA). A person skilled in the art can decide arbitrarily the kind and ratio of the structure unit relative to the hydrophobic block as the entirety of the block is hydrophobic as set forth above. For example, the total lactic acid units included in the hydrophobic block is in the range of 5-400. Specifically, for example, the hydrophobic block is not branched, the number of lactic acid units can be e.g., in the range of 5-100, 15-60 or 25-45. The hydrophobic block is branched, the number of lactic acid units included in the entirety of the branch can be e.g., in the range of 10-400 and preferably 20-200. In this case, an average lactic acid unit number per branch can be, e.g., in the range of 5-100 and preferably 10-100.

If the structure unit number is over the above range and then molecular assembly is formed, the formed molecular assembly tends to be less stable. If the structure unit number is less than the above range, it tends that the formation of the molecular assembly per se might be difficult.

In the case of branched hydrophobic block, the number of branches is not particularly limited, but in the light of obtaining efficiently particle like micelles upon forming the molecular assembly, for example, it can be less than the branch number of the hydrophilic block.

Polylactic acid has the following basic properties.

Polylactic acid has a superior biocompatibility and stability. Accordingly, the molecular assembly obtained from an amphiphilic substance having polylactic acid as an constitution block is very useful in the light of application in vivo, particularly human.

Further, as polylactic acid has a superior biodegradability, it can be quickly metabolized so that the integration in the normal human tissue other than the cancer tissue is less. Accordingly, the molecular assembly obtained from an amphiphilic substance having polylactic acid as an constitution block is very useful in the light of specific integration in the cancer tissue.

In addition, poly lactic acid is highly soluble in a low boiling point solvent so that the use of harmful high boiling point solvent can be avoided when the molecular assembly is obtained from the amphiphilic substance having poly lactic acid as a constitution block. Accordingly, such molecular assembly is very useful in the light of safety relative to in vivo.

Further, relative to poly lactic acid chain (PLA) constituting hydrophobic block, all lactic acid units can be either sequential or non-sequential, but the molecular design is preferable as the entirety of the hydrophobic block might not damage the above basic properties.

Poly lactic acid chain (PLA) constituting hydrophobic block can be either poly-L-lactic acid chain (PLLA) comprising L-lactic acid unit or poly-D-lactic acid chain (PDLA) comprising D-lactic acid unit. Further, it may comprise both L-lactic acid unit and D-lactic acid unit. In this case, L-lactic acid unit and D-lactic acid unit may be in any arrangement including alternative arrangement, block arrangement or random arrangement.

1-3. Ratio of Sarcosine Unit Number to Lactic Acid Unit Number

Relative to an amphiphilic block polymer, if sarcosine unit number (i.e., a number of sarcosine units included in a hydrophilic block or a number of sarcosine units included in the entirety of branches in the case of the branched hydrophilic block) is NS and a number of poly lactic acid units (i.e., a number of lactic acid units included in a hydrophobic block or a number of lactic acid units included in the entirety of branches in the case of the branched hydrophobic block) is NL, the ratio NS/NL can be, for example, in the range of 0.05-5 or 0.05-4. Further preferably, NS/NL can be more than 0.05 and less than 1.8, for example, more than 0.05 and less than 1.7, more than 0.05 and less than 1.67. more than 0.1 and less than 1.7, or more than 0.1 and less than 1.67.

1-4. Structure of Polymer

If a structure of a linker element connecting a hydrophilic block and a hydrophobic block is chemically-acceptable structure, it is not particularly limited. A person killed in the art can arbitrarily design the molecule.

In the case of a branched structure, for example, if the number of branches of the hydrophilic block is two, two molecular chains including polysarcosine chain can branch from one N-atom of the linker element of the molecular chain including poly lactic acid chain. In other words, N-atom connecting directly or indirectly to poly lactic acid chain can connect directly or indirectly to 2 polysarcosine chains.

Further, for example, if the number of branches of the hydrophilic block is three, three molecular chains including polysarcosine chain can branch from one C-atom of the linker element of the molecular chain including poly lactic acid chain. In other words, C-atom connecting directly or indirectly to poly lactic acid chain can connect directly or indirectly to three polysarcosine chains. If one P-atom or Si-atom of the linker element branches or if the entirety of an amphiphilic block polymer molecule forms quaternary ammonium molecule, it can be the same.

If the number of branches of the hydrophilic block is more than three, it can be designed as the branch has an additional branch structure.

If the hydrophobic block branches, a molecule can be designed as well as from the above standpoint.

The following Formula 1 illustrates the preferred structure of the branched amphiphilic block polymer when the number of branches in the hydrophilic block side is three and there is no branch in the hydrophobic block side.

Chemical Formula 1

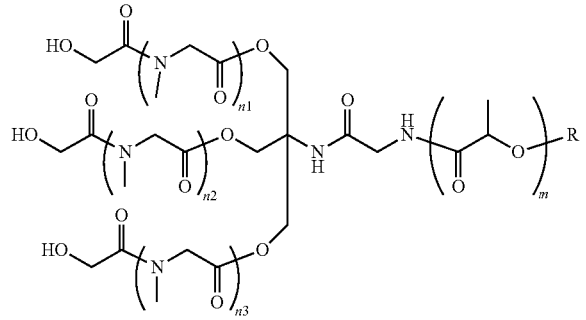

In Formula (I), n1, n2 and n3 provide the total number in the range of 3-200, m represents in the range of 5-100, and R represents hydrogen atom or an organic group. The organic group may have a carbon number in the range of 1-20. Specifically, alkyl group and alkylcarbonyl group and so forth may be included.

The following Formula (II) illustrates the preferred structure of the branched amphiphilic block polymer when the number of branches in the hydrophilic block side is three and the number of branches in the hydrophobic block side is two.

Chemical Formula 2

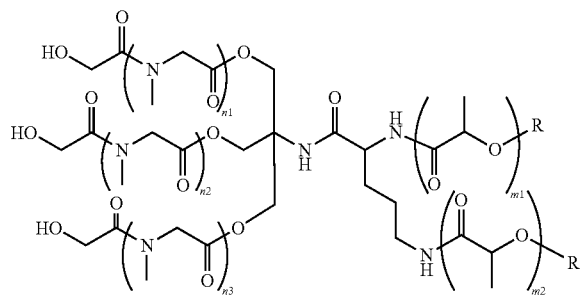

n1, n2 and n3, and R in Formula (II) are the same as in Formula (I). The total number of m1 and m2 is in the range of 10-400.

1-5. Synthetic Method of an Amphiphilic Block Polymer

A person skilled in the art can arbitrarily make an synthesis of a linear type amphiphilic block polymer. For example, a functional group (e.g., amino group) that can be a linker connecting a hydrophilic block (polysarcosine moiety) can be induced to one end of poly lactic acid chain along with the synthesis of a hydrophobic block (poly lactic acid moiety). Then, a polysarcosine can be induced to the amino group.

In the synthesis of a branched amphiphilic block polymer, the synthesis of a hydrophobic block moiety (poly lactic acid moiety), the synthesis of hydrophilic block moiety (sarcosine moiety or polysarcosine moiety) and the synthesis of a linker moiety connecting them are conducted.

For example, a linker agent to connect sarcosine or polysarcosine chain and a poly lactic acid chain is synthesized as a initiator, and then a branched amphiphilic block polymer can be synthesized by extending the linker agent by addition of sarcosine moiety or polymerization of polysarcosine moiety and by polymerization of poly lactic acid moiety.

Further, for example, after addition of sarcosine to the linker agent, or after addition of polysarcosine chain as the hydrophilic block prepared by polymerization in advance, the poly lactic acid chain is extended to synthesize the branched amphiphilic block polymer.

Further, for example, both polysarcosine or polysarcosine chain and poly lactic acid chain are prepared in advance respectively as a hydrophilic block and a hydrophobic block, and each block can be connected by a linker agent, separately synthesized, to synthesize a branched amphiphilic block polymer.

A structure of a linker agent may include one or a number of functional groups (e.g., hydroxy group, amino group) connectible to lactic acid monomers (lactic acid or lactide) or poly lactic acid chain corresponding to the desired branch number of the hydrophobic block side, and a number of functional groups (e.g., amino group) connectible to sarcosine monomer (e.g., sarcosine or N-carboxysarcosine anhydride) or polysarcosine corresponding to the desired branch number of the hydrophilic block side. In this case, a person skilled in the art may arbitrarily design as the linker agent can react equally as much as possible with each functional group connectible to sarcosine monomer or polysarcosine.

Each functional group connectible to lactic acid monomer or poly lactic acid chain and functional group connectible to sarcosine monomer or polysarcosine can be protected by a protection group. In this case, a person skilled in the art may arbitrarily design the protection group that can be removed selectively according to necessity. For example, in the case of a branched amphiphilic block polymer having 3 branches in the hydrophilic block side, the linker agent can be prepared based on the structure of e.g., tris-hydroxymethyl aminomethane (Tris).

Further, in the case of branching in the hydrophobic block side, the linker agent can be prepared based on the structure having an additional branching point to the above tris-hydroxymethyl aminomethane structure. Further, the structure having additional branching points can be obtained by addition of amino acid derivative, of which all amino groups of e.g., amino acids having amino group in the side chain thereof (lysine and ornithine as a specific example) as connectible functional group to poly lactic acid chain are protected, to tris-hydroxymethyl aminomethane and deprotection thereafter. Further, the branching point can be increased by addition of the similar amino acid derivative to the free amino group freed by deprotection.

A person skilled in the art may arbitrarily decide the synthesis method of polysarcosine chain or poly lactic acid chain based on the functional group of the linker agent and may select from conventional peptide synthesis methods or polyester synthesis methods.

For peptide synthesis, ring-opening polymerization of N-carboxysarcosine anhydride (sarcosine NCA) and so forth is preferable, wherein, for example, the base group such as an amino group of the linker agent is used as an initiator.

For polyester synthesis, ring-opening polymerization of lactide and so forth is preferable, wherein, for example, the base group such as an amino group of the linker agent is used as an initiator.

Further, in the case of synthesis of a branched amphiphilic block polymer having a different number of branches from the above specific examples, a person skilled in the art may arbitrarily prepare by adding a variety of alternations from organic chemistry standpoints.

The adjustment of chain length of polysarcosine chain and poly lactic acid chain can be achieved by adjusting the content ratio of an initiator and a monomer relative to the polymerization reaction. In addition, the chain length can be confirmed by e.g., $^1$H-NMR.

2. Molecular Assembly

According to the present invention, molecular assembly (nanoparticles), e.g., micelles having nano-order size, multi-micelles, vesicle and so forth, is formed by aggregation of an amphiphilic block polymer comprising a hydrophilic block and a hydrophobic block or by self-assembly orientation.

Next, as an example of an amphiphilic block polymer, the case using an amphiphilic block polymer comprising a hydrophilic block having sarcosine unit and a hydrophobic block having lactic acid unit is set forth.

According to the present invention, molecular assembly (lactosome) is a structure obtained by aggregation of the above linear or branched amphiphilic block polymer or self-assembly orientation thereof. According to the present invention, micelles like molecular assembly comprising hydrophobic block inside (core) and hydrophilic block outside (shell) is preferable from piratical use standpoints. The molecular assembly according to the present invention can be a useful constitution as a probe for molecular imaging and a pharmaceutical substance for DDS by containing adequate metal ions.

A branched amphiphilic block polymer has larger molecular cross-section area of hydrophilic moiety compared to a linear amphiphilic block polymer because of a plurality of polysarcosine chain as the branch chain. Accordingly, the molecular assembly formed from the branched type amphiphilic block polymer has superior stability particle-wise. Further, the particle may have a large curvature. Accordingly, the molecular assembly comprising the branched type amphiphilic block polymer has basic characteristics in that miniaturization of the particle can be achieved.

Further, the molecular assembly comprising the branched type amphiphilic block polymer has basic characteristics in that higher surface density of hydrophilic group compared to the linear "Lactosome" and less exposure of the hydrophobic moiety because of a plurality of polysarcosine chains as the branch chain.

3. Preparation of Molecular Assembly

The inventor sets forth in the figures a manufacturing method for molecular assembly (nanoparticles) comprising an amphiphilic block polymer having an hydrophilic block and a hydrophobic block.

According to the present invention, the present invention comprises a step of forming a laminar flow of polymer solution by inducing a solution comprising amphiphilic block polymer including a hydrophilic block and a hydrophobic block in an organic solvent into a polymer solution supply flow passage, a step of forming at least two laminar flows of water system solution by inducing the water system solution to at least two water system solution supply passages, and a step of forming nanoparticles comprising the amphiphilic block polymer by making confluence as if at least two laminar flow of water system solution sandwich the laminar flow of the polymer solution.

An organic solvent to dissolve a amphiphilic block polymer may include e.g., tri-fluoroethanol, ethanol, hexa-fluoroisopropanol, dimethyl sulfoxide, dimethylformamide and so forth. Further, water system solution means water or an aqueous solution. Distilled water, distilled water for injection, saline and buffer solution can be used.

FIG. 1 is a schematic plan view illustrating a confluent mode of a laminar flow of an amphiphilic block polymer and a laminar flow of a water system solution. Referring to FIG. 1, the confluent section J is formed in place two water system solution supply flow passages Cw1, Cw2 relative to the polymer solution supply flow passage Cp as if the laminar flows Fw1, Fw2 of water system solution sandwich the laminar flow Fp of polymer solution from both right side and left side relative to the flow direction of the polymer solution toward downstream side from upperstream side at the downstream end of the polymer solution supply flow passage Cp. According to such confluent structure of the flow passage, the laminar flows (flow) Fw1, Fw2 sandwich the laminar flow (flow) Fp of the polymer solution. Accordingly, the laminar flow Fp of the polymer solution flows mainly the center of the flow passage and the laminar flows Fw1, Fw2 of the water system solution flow mainly the inner periphery area (area contacting inside wall of the flow passage) of the flow passage toward the nanoparticle forming flow passage Cn in the downstream side from the confluent section J. The flow rate of the laminar flow Fp of the polymer solution increases because of running in the center of the flow passage so that the area of the liquid-liquid boundary face in between the laminar flows Fw1, Fw2 of the water system solution surrounding the laminar flow of the polymer solution may increase. It is considered that the self-assembly of the amphiphilic block polymer may take place mainly in the liquid-liquid boundary face. The self-assembly of the amphiphilic block polymer is enhanced by an increase of the area of the liquid-liquid boundary face at the confluent section and an increase of the flow rate of the laminar flow of the polymer solution and nanoparticles having an uniform particle diameter approximately in the range of 20-200 nm are formed (i.e., the particle distribution provides a single peak property).

Figure 2:
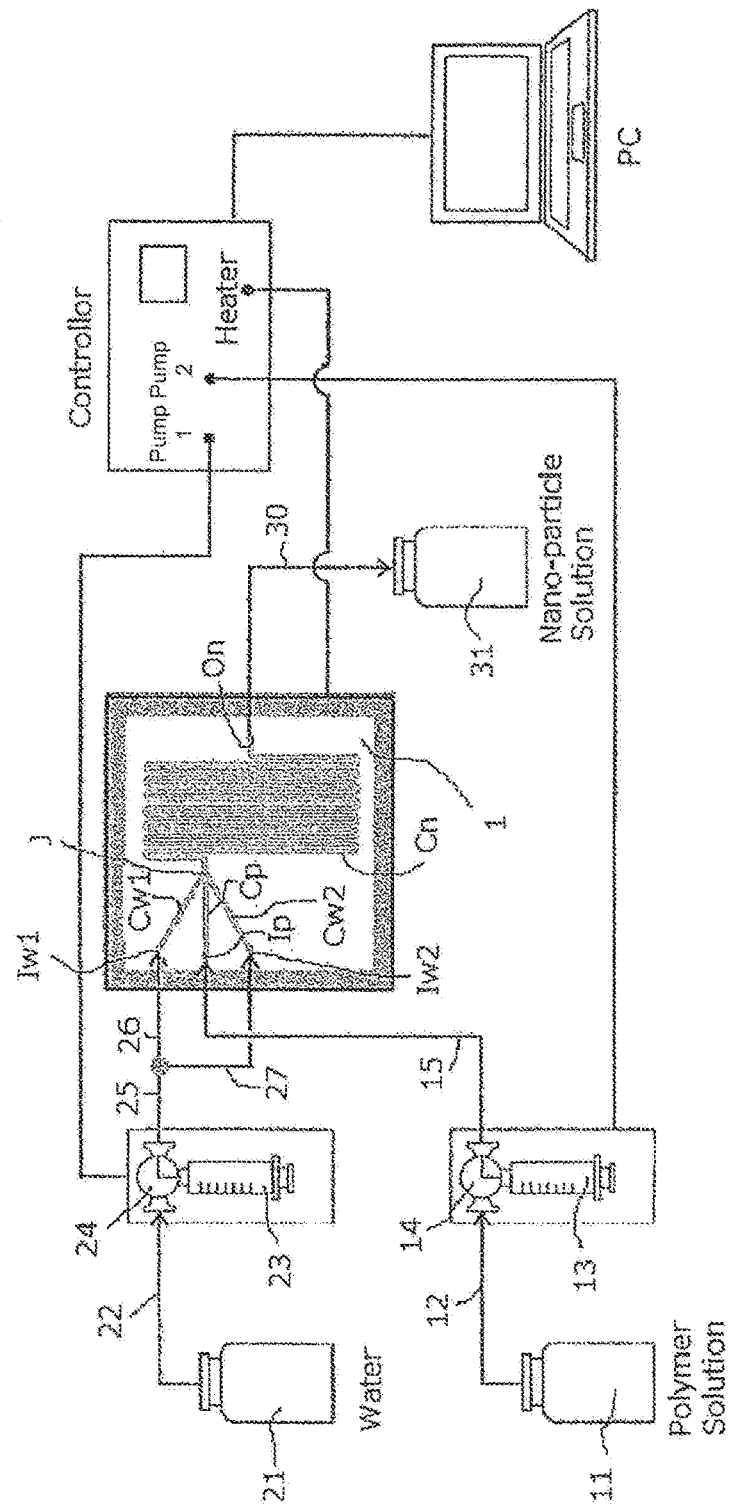
FIG. 2 is a schematic diagram illustrating an example of manufacturing apparatuses for a nanoparticle.

FIG. 2 is a schematic diagram illustrating an example of manufacturing apparatus for a nanoparticle. Referring to FIG. 2, a manufacturing apparatus comprises a micro flow cell having the above flow passage confluence structure, a means that supplies a polymer solution to the micro flow cell, a means that supplies a water system solution to the micro flow cell and a means that recovers a nanoparticle inclusion solution from the micro flow cell.

The micro flow cell comprises the flow passage confluence structure illustrated in FIG. 1, but the structure thereof is not particularly limited. Referring to FIG. 2. the micro flow cell comprises; a polymer solution inlet Ip, the polymer solution supply flow passage Cp connected to the polymer inlet Ip, at least two water system solution inlets Iw1, Iw2, at least two water system solution supply flow passages Cw1, Cw2 connected to each water system solution inlet Iw1, Iw2, and a confluent section J, wherein the polymer solution supply flow passage Cp and at least two water system solution supply flow passages Cw1, Cw2 are confluent, a nanoparticle formation flow passage Cn in place in the downstream side of the confluent section and an nanoparticles inclusion solution outlet On at downstream end of the nanoparticle formation flow passage Cn, wherein the confluent section J is formed in place as if at least two water system solution supply flow passages Cw1, Cw2 sandwich the polymer solution supply flow passage Cp.

The polymer solution supply means comprises a polymer solution tank 11, a syringe pump 13 and further comprises a three-way valve 14 connecting the tank 11 through a tube passage 12 and a tube passage 15 extending from the three-way valve 14 and connecting to the polymer solution inlet Ip of the micro flow cell 1.

The polymer solution supply means comprises a water system solution tank 21, a syringe pump 23 and further comprises a three-way valve 24 connecting the tank 21 through a tube passage 22 and a tube passage 25 extending from the three-way valve 24 and tube passages 26, 27 branching in two ways from the tube passage 25 and extending and connecting to each water system solution inlet Iw1, Iw2 of the micro flow cell 1.

The nanoparticle inclusion solution recovery means comprises a tube passage 30 extending from the nanoparticle inclusion solution outlet On of the micro flow cell 1 and a nanoparticle inclusion solution recovery tank 31 connected to the tube passage 30.

Figure 3:
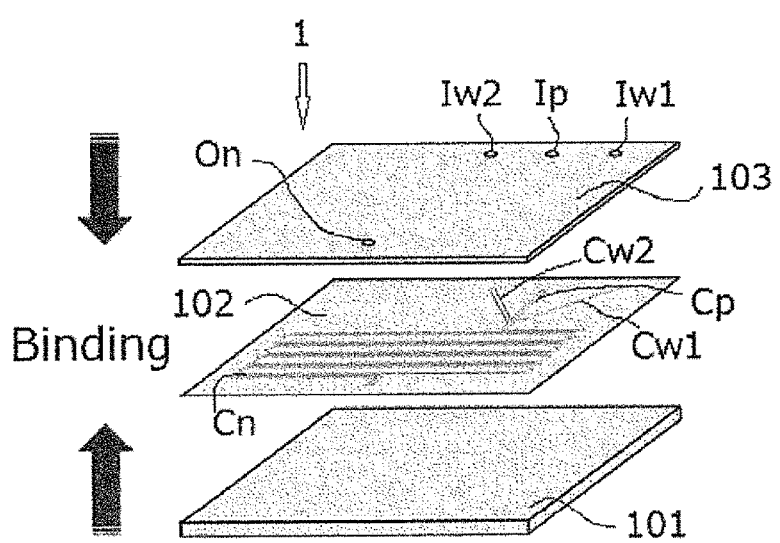
FIG. 3 is a detail view illustrating a micro flow cell.

FIG. 3 is a detail view illustrating a micro flow cell.

If the micro flow cell 1 comprises the above elements, it is not particularly limited. Further specifically, the micro flow cell 1 comprises: a substrate 101, a resin film 102 that is in-place on the substrate 1, wherein the polymer solution supply flow passage Cp, at least two water system solution supply flow passages Cw1, Cw2, the confluent section J and nanoparticle formation flow passage Cn are formed, a cover sheet 103 that is in-place on the resin film 102, wherein the polymer solution inlet Ip is formed at the position corresponding to the upperstream end of the polymer solution supply flow passage Cp, at least two water system solution inlets Iw1, Iw2 is formed at the position corresponding to each upperstream end of two water system solution supply flow passages Cw1, Cw2 and the nanoparticle inclusion solution outlet On is formed at the position corresponding to the downstream end of the nanoparticle formation flow passage Cn, wherein the substrate 101 and the resin film 102, and resin film 102 and the cover sheet 103 are connected in the liquid-tight state.

Specifically, the confluent section J of the micro flow cell 1 is formed in place with the two water system solution supply flow passages Cw1, Cw2 relative to the polymer solution supply flow passage Cp as if the laminar flows of water system solution sandwich the laminar flow of polymer solution from both right side and left side relative the flow direction of the polymer solution toward downstream side from upperstream side at the downstream end of the polymer solution supply flow passage Cp.

The above substrate 101, the resin film 103, and the cover sheet 103 may be formed from a resin material. As the resin material, the cyclic polyolefin (COP) synthesized from the monomer, cycloolefin, is preferred from having transparency thereof and superior thermocompression bonding property thereof. Each thickness thereof is not particularly limited but it is preferably approximately in the range of 1 mm-3 mm relative to the substrate 101, e.g., approximately 2 mm, approximately in the range of 50 m-200 μm relative to the resin film 102, e.g., approximately 100 μm, and approximately in the range of 200 μm-1 mm relative to the cover sheet 103, e.g., 500 μm. It is preferable that since COP is a non-polar material, the surface modification therefor is arbitrarily processed with ultraviolet ray or plasma and then thermocompression bonding is conducted to join the substrate 101 and the resin film 102, and the resin film 102 and the cover sheet 103, in the liquid-tight state. Thermocompression bonding is a method to join plural materials at lower temperature than melting point thereof by pressure tight-joining to cause plastic deformation. Even depending on the process condition for thermocompression bonding, the height of each passage can be obtained corresponding to the thickness of the resin film 102.

The amphiphilic block polymer inclusion solution in the polymer solution tank 11 is induced into the polymer solution inlet Ip of the micro flow cell 1 while controlling the flow rate by the syringe pump 13 and the three-way valve 14, the laminar flow Fp of the polymer solution is supplied to the confluent section J through the polymer solution supply flow passage Cp, the water system solution in the water system solution tank 21 is induced into the water system solution inlets Iw1, Iw2 of the micro flow cell 1 while controlling the flow rate by the syringe pump 23 and the three-way valve 24, and the laminar flows Fw1, Fw2 of the two water system solution is supplied to the confluent section J through the two water system solution supply flow passages Cw1, Cw2. The laminar flows (flow) Fw1, Fw2 of the two water system solution sandwich the laminar flow (flow) Fp of the polymer solution to make confluence. Referring to FIG. 1, the laminar flow Fp of the polymer solution flows mainly the center of the flow passage and the laminar flows Fw1, Fw2 of the water system solution flow mainly the inner periphery area (area contacting inside wall of the flow passage) of the flow passage toward the nanoparticle forming flow passage Cn in the downstream side from the confluent section J. The flow rate of the laminar flow Fp of the polymer solution increases because of running in the center of the flow passage so that the area of the liquid-liquid boundary face in between the laminar flows Fw1, Fw2 of the water system solution surrounding the laminar flow of the polymer solution may increase. The self-assembly of the amphiphilic block polymer is enhanced by an increase of the area of the liquid-liquid boundary face at the confluent section and an increase of the flow rate of the laminar flow of the polymer solution and nanoparticles having an uniform particle diameter approximately in the range of 20-200 nm are formed (i.e., the particle distribution provides a single peak property). The nanoparticle inclusion solution coming out from the nanoparticle inclusion solution outlet On is recovered into the recovery tank 31.

The recovered nanoparticle inclusion solution is arbitrarily subjected to the post processes. The step of the post processes includes a step of removing the organic solvent. Further, the step of purifying process may be arbitrarily conducted prior to the step of removing the organic solvent. The purifying process may include e.g., gel filtration chromatography, filtering and ultracentrifugation and so forth. Accordingly, nanoparticle solution and/or suspension solution can be obtained.

The obtained nanoparticle solution and/or suspension solution may be subjected to a freeze-drying process. The method of freeze-drying process may include any known method, but particularly not limited. For example, the obtained above nanoparticle solution and/or suspension solution is frozen with e.g., liquid nitrogen and then subjected to sublimation under vacuum. Accordingly, the freeze-drying processed molecular assembly can be obtained. Specifically, the molecular assembly can be stored as the freeze-drying processed material. According to necessity, the molecular assembly suspension solution can be obtained by adding water or an aqueous solution to the freeze-dried material and then the molecular assembly can be provided for use. Water or an aqueous solution is not particularly limited and a person skilled in the art may arbitrarily select biochemistry-wise or pharmacology-wise available water or an aqueous solution. For example, distilled water, distilled water for injection, saline and buffer solution may be included.

4. Particle Size of Molecular Assembly

An particle diameter of the molecular assembly manufactured according to the present invention is, e.g., in the range of 10-200 nm. Here, the particle diameter is the particle diameter that is most frequently appeared particle diameter in the particle distribution, i.e., the central particle diameter. The method to measure the size of molecular assembly of the present invention is not particularly limited and a person skilled in the art can select arbitrarily. For example, the method may include; an observation method using Transmission Electron Microscope (TEM), Atomic Force Microscope (AFM); and Dynamic Light Scattering (DLS) and so forth. DLS method measures a migration diffusion coefficient of particles under Brownian motion in the solution. Dynamic Light Scattering (DLS) is applied in Example of the present specification.

Particle diameter of nanoparticles can be controlled by changing the induced flow volume of the polymer solution and the induced flow volume of the water system solution, changing the flow rate of the laminar flow Fp of the polymer solution at the confluent section J and the flow rate of the laminar flows Fw1, Fw2 of the water system solution surrounding the polymer solution, and changing the area of liquid-liquid boundary face. Nanoparticles having further smaller diameter and nanoparticles providing the single peak property in the particle distribution can be obtained by increasing the total flow volume of the polymer solution and the water system solution.

For example, as illustrated in Example, in the case of Lactosome comprising the linear type amphiphilic block polymer comprising the hydrophilic block comprising sarcosine unit and the hydrophobic block comprising the lactic acid unit, if the total flow rate of the polymer solution and the water system solution in the nanoparticle formation flow passage Cn in the downstream side of the confluent section J increases from 1000 µL/min to 3000 µL/min, the particle diameter of obtained nanoparticles decreases from 115 nm to 43 nm and the single peak property of the particle distribution can be improved. Accordingly, the particle diameter of the obtained nanoparticles can be controlled.

If the hydrophilic block in the amphiphilic block polymer has a branch structure, the particle constituted therefrom provides a smaller particle diameter than that of the linear type. For example, in the case of lactosome, the particle diameter of the particle comprising the linear type polymer can be approximately in the range of 35-200 nm and in contrast the particle diameter of the particle comprising the branched type polymer can be approximately in the range of 10-30 nm. If combining the linear type polymer and the branch type polymer together and changing the ratio thereof, the particle diameter is further controllable. The smaller the particle diameter (e.g., less than 50 nm), the more easily EPR Effect can be obtained on the in-vivo administration.

5. Drug Delivery System/Molecular Imaging

According to the present invention, when the nanoparticle is prepared, a pharmaceutical agent and/or a labeling agent inclusion nanoparticle can be obtained by inclusion of the pharmaceutical agent and/or a labeling agent into the polymer solution. In that case, the pharmaceutical agent and/or the labeling agent may dissolve in the organic solvent. Further, when the nanoparticle is prepared, a pharmaceutical agent and/or a labeling agent inclusion nanoparticle can be obtained by inclusion of the pharmaceutical agent and/or a labeling agent into the water system solution. In that case, the pharmaceutical agent and/or the labeling agent may dissolve in water. A person skilled in the art may arbitrarily select a pharmaceutical agent and/or a labeling agent based on the purpose therefor.

5-1. Administration Subject of Molecular Assembly

According to the present invention, DDS and the molecular imaging may include the in-vivo administration of the above molecular assembly. The in-vivo subject to which the molecular assembly is administered is not particularly limited but human and non-human animals may be included. Non-human animals are not particularly limited, but mammalians other than human, further specifically, may include primates, gnawing mammal (e.g., mouse, rat), rabbit, dog, cat, pig, cow, sheep, and horse and so forth.

The molecular assembly employed in the method according to the present invention has superior site-specific integration property in the vascular lesion region (e.g., malignant tumor region, inflammation region, arterial sclerosis region, angiogenesis region and so forth). The molecular assembly of the present invention integrates to the lesions due to the EPR (enhanced permeability and retention) Effect so that the integration property thereto can be independent from the kind of tissue of the vascular lesion. The administration subject of the fluorescent probe of the present invention is preferably a cancer. A variety of cancers can be the administration subject therefor. For example, the administration subject may include liver cancer, pancreas cancer, lung cancer, uterocervical cancer, breast cancer and colon cancer and so forth.

5-2. Administration

In-vivo administration method is not particularly limited, but a person skilled in the art may arbitrarily decide. Accordingly, the administration method cannot be issue relative to systemic-administration or local administration. Specifically the administration of the molecular probe may include any injection (with a need or needless), oral administration or topical administration.

5-3. Detection of Molecular Assembly

According to the present invention, the molecular imaging comprises a step of detecting the signal originated from the administered molecular assembly. The administered molecular assembly is detected so that the aspect (particularly location/size of tissue e.g., cancer) of the administration subject can be observed from outside of the body. As the detection method, any means that can visualize the administered molecular assembly can be applied. A person skilled in the art may arbitrarily decide the detection means based on the kind of labeling agent inclusion molecular assembly.

A person skilled in the art may arbitrarily decide the time from administration to beginning of the detection. For example, the time can be in between 1-24 hours post-administration. The integration amount or the time-course variation of the integration amount in the tumor or other than the tumor can be investigated.

Further, it is preferable that the detection of the molecular assembly is based on the measurement from a plurality of directions rather than one direction of the in-vivo subject from accuracy standpoint. Specifically, at least three directions may be selected and further preferably at least five directions may be selected for the measurement. In the case of the measurement from five directions, e.g., both right and left side of the venter, both right and left sides of the body and the back side.

EXAMPLE(S)

Hereafter, the inventor sets forth further detail of the present invention referring to Examples but the present invention is not limited to Examples.

1-5. Synthetic Method of Amphiphilic Block Polymer

According to Example, the linear type amphiphilic block polymer (PLLA39-PSar74) comprising the hydrophilic block having 74 sarcosine units and the hydrophobic block having 39 L-lactic acid units is employed. Referring the method disclosed in WO2009/148121 and WO2012/17688, the synthesis of polymer is conducted by using glycolic acid, O-(benzotriazol-1-yl)-N,N,N',N'-tetramethyluronium-hexafluorophosphate (HATU) and N,N-Diisopropylethyl-amine (DIEA) from sarcosine-NCA (Sar-NCA) and amino-poly-L-lactic acid ((a-PLLA).

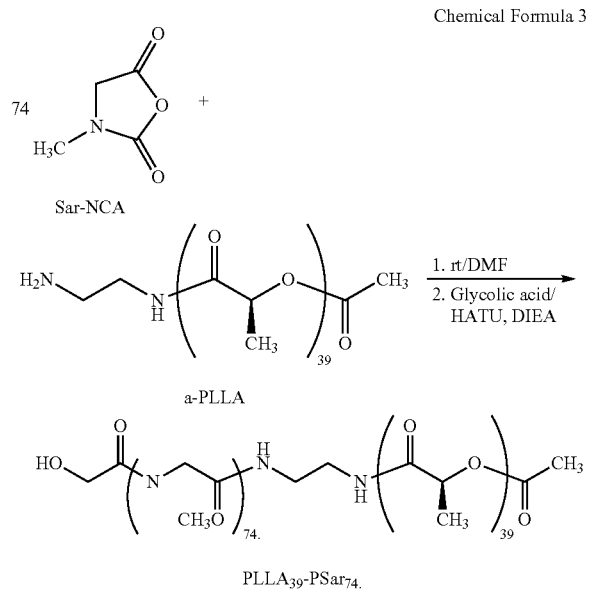

Chemical Formula 3

Example 1

Nanoparticles were prepared from the linear type amphiphilic block polymer (PLLA39-PSar74) using apparatuses illustrated in FIG. 1-3 as follows.

Milli-Q was used for water 21. The amphiphilic block polymer (PLLA39-PSar74) was dissolved in DMF to provide the 8 mg/mL solution, and stirred at 60□ for 30 min in the oil bath and then cooled down to room temperature to provide the polymer solution 11 to be used.

Referring to the apparatus in FIGs., the syringe pump 14, 24 (Hamilton PSD/3) was used to send the solution, and two solutions of the polymer solution 11 and the water system solution 21 were induced to the micro flow cell 1 fixed to the jig through Teflon® tube 12, 15, 22, 25, 26, 27. A heater and a thermocouple are installed to the jig so that the micro flow cell can be heated. The syringe pumps 14, 24 are connected to a personal computer through a controller so that the flow rate control could be conducted by the personal computer. First, the flow passage Cn in the downstream from the confluent section J was filled up with water and then the polymer solution was sent, the first flow 500 µL was discarded and the sampling was initiated. Further, the capacity of the syringe is 2.5 mL so that the solution sending has been suspended at the time when all water were flowed out. The particle diameter and the particle distribution of the obtained sample were measured by using DLS (Malvern Zetasizer Nano S).

The water flow rate FRR to the polymer solution (Flow Rate Ratio) is represented by FRR=Qw/Qp; wherein a polymer solution flow rate Qp, and Qw is a flow rate of water.

In Example, FRR is set as FRR=9. The total flow rate of the polymer solution and water is Qt=Qw+Qp. Further, water was partitioned to each tube passage 26, 27 through two way connector from the tube passage 25 to make water flow rate to each water system solution supply flow passages Cw1, Cw2 equal.

Figure 4A:
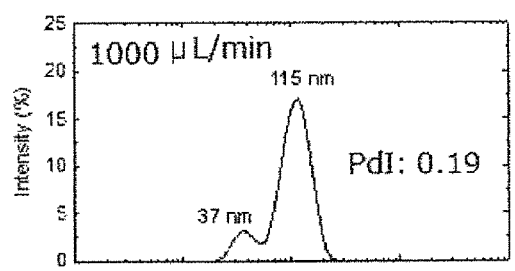
FIGS. 4(A), 4(B), 4(C) are graphs illustrating the DLS measurement result of Example 1.
Figure 4B:
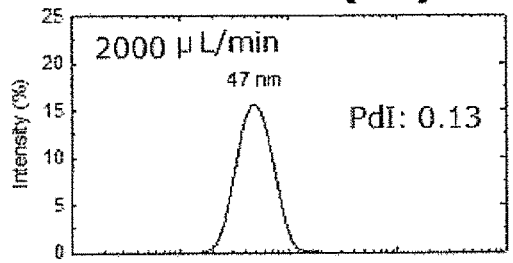
Figure 4C:
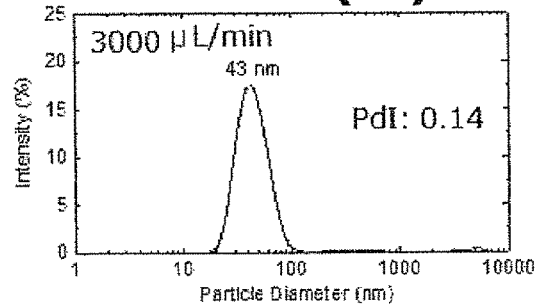
Figure 4D:
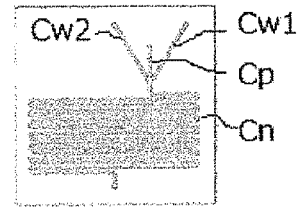
FIG. 4(D) is a diagram illustrating a flow passage of the micro flow cell of Example 1.

Referring to Example 1, the width of flow passage of the micro flow cell shown in FIG. 4(D) is 700 µm; the flow passage length thereof is 611 mm; the flow capacity is 29 µL; and the turn number relative to the nanoparticle formation flow passage Cn in the downstream from the confluent section J is 14. Temperature of the flow passage of the micro flow cell was 25° C. In addition, referring to FIG. 3, all substrate 101, resin film 102, and cover sheet 103 are made of cycloolefin resin (Zeonor(™) 1600R, glass transition temperature 161° C., Nippon Zeon), the thickness of the substrate 101 is 2 mm, the thickness of the resin film 102 is 100 µm and the thickness of the resin film 103 is 500 µm.

(a) Firstly, under FRR=9 condition, the polymer solution and water were induced to the polymer solution supply flow passage Cp and two water system solution supply flow passages Cw1, Cw2 to make 1000 µL/min of the total flow rate of the polymer solution and water, Qt=Qw+Qp. Nanoparticles inclusion solution is recovered 31 from the downstream end of the nanoparticle formation flow passage Cn. The recovered nanoparticles inclusion solution is diluted with Milli-Q to make double. The diluted solution was filtrated through 200 nm filter (PALL Acrodisc® 25 mm Syringe Filter w/0.2 µm Supor® Membrane) and the processed solution with the filter was subjected to DLC measurement.

The result of DLS measurement is illustrated in FIG. 4(A). The horizontal axis is Particle Diameter in nm and the perpendicular axis is Intensity in %. The main peak appears at 115 nm and the side peak appears at 37 nm. PdI value representing the level of polydispersity of particle distributional is 0.19.

(b) Next, under FRR=9 condition, the polymer solution and water were induced to the polymer solution supply flow passage Cp and two water system solution supply flow passages Cw1, Cw2 to make 2000 µL/min of the total flow rate of the polymer solution and water, Qt=Qw+Qp and other than that, the same operations as the above (a) have been conducted and DLS (using Malvern Instruments Ltd, Zetasizer Nano S) thereof was measured.

The result of DLS measurement is illustrated in FIG. 4(B). The main peak appears at 47 nm and obviously the single peak property was provided. PdI value is 0.13.

(c) Next, under FRR=9 condition, the polymer solution and water were induced to the polymer solution supply flow passage Cp and two water system solution supply flow passages Cw1, Cw2 to make 3000 µL/min of the total flow rate of the polymer solution and water, Qt=Qw+Qp and other than that, the same operations as the above (a) have been conducted and DLS thereof was measured.

The result of DLS measurement is illustrated in FIG. 4(C). The main peak appears at 43 nm and obviously the single peak property was provided. PdI value is 0.14.

Accordingly, miniaturization of nanoparticles and providing the single peak property are achieved by increasing the total flow quantity Qt of the solution.

Comparison Example 1

Instead of the micro flow cell 1 referring to FIG. 1-3, the micro flow cell having Y structure relative to the confluent structure of flow passages is employed and other than that, the same operations as Example 1 have been conducted. FIG. 5(D) is a schematic view illustrating the flow passages of the micro flow cell. Further, FIG. 6 is a schematic plan view illustrating a confluent mode of a laminar flow of a polymer solution and a laminar flow of a water system solution.

Figure 5A:
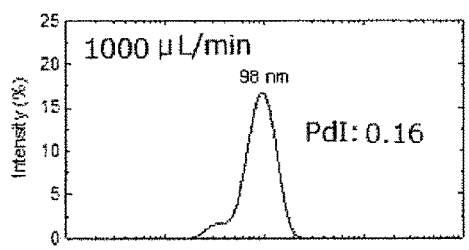
FIGS. 5(A), 5(B), 5(C) are graphs illustrating the DLS measurement result of Comparison Example 1.
Figure 5B:
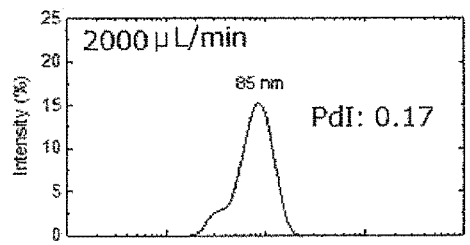
Figure 5C:
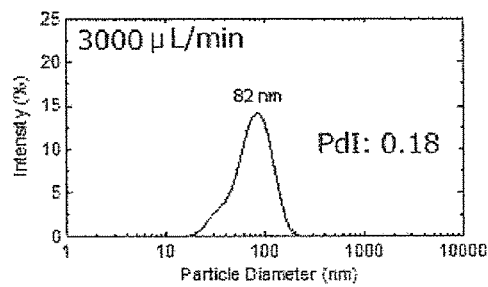
Figure 5D:
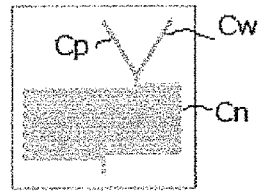
FIG. 5(D) is a diagram illustrating a flow passage of the micro flow cell of Comparison Example 1.
Figure 6:
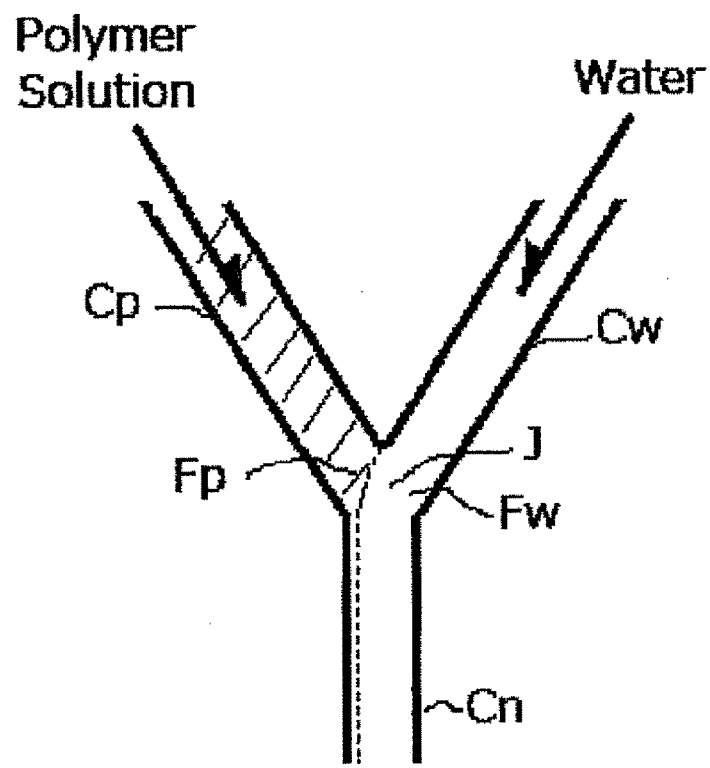
FIG. 6 is a schematic plan view illustrating a confluent mode of a laminar flow of an amphiphilic block polymer and a laminar flow of a water system solution of a Comparison Example.

Referring to FIG. 5 and FIG. 6, the polymer solution supply flow passage Cp and one water system solution supply flow passage Cw join at the confluent section J and make Y shape with the nanoparticle formation flow passage Cn in the downstream side from the confluent section J. Specifically, the confluent section J is formed in place with one water system solution supply flow passage Cw relative to the polymer solution supply flow passage Cp as if the laminar flow Fw of water system solution from only left side relative the flow direction of the polymer solution toward downstream side from upperstream side pushes the laminar flow Fp of the polymer solution to the inside wall surface of the nanoparticle formation flow passage Cn. According to such flow passage structure, the laminar flow (flow) Fp of the polymer solution cannot run in the center of flow passage and flows mainly in the contact area of the inside wall of the flow passage. Therefore, the flow rate of the laminar flow Fp of the polymer solution will not increase and the area of the liquid-liquid boundary surface in between the laminar flow of the water system solution might not increase. Accordingly, such confluent structure does not accelerate the self-assembly of the amphiphilic block polymer and the single peak property of the particles is inferior.

Referring to Comparison Example 1, the width of flow passage of the micro flow cell is 700 μm; the flow passage length thereof is 611 mm; the flow capacity is 28 μL; and the turn number relative to the nanoparticle formation flow passage Cn in the downstream from the confluent section J is 14. Temperature of the flow passage of the micro flow cell was 25□.

(a) First, under FRR=9 condition, the polymer solution and water were induced to the polymer solution supply flow passage Cp and the water system solution supply flow passage Cw to make 1000 μL/min of the total flow rate of the polymer solution and water, Qt=Qw+Qp, and other than that, the same operations as the above Example 1(a) have been conducted and DLS thereof was measured.

The result of DLS measurement is illustrated in FIG. 5(A). The main peak appears at 98 nm and the smaller peak appears. PdI value is 0.16.

(b) First, under FRR=9 condition, the polymer solution and water were induced to the polymer solution supply flow passage Cp and the water system solution supply flow passage Cw to make 2000 μL/min of the total flow rate of the polymer solution and water, Qt=Qw+Qp, and other than that, the same operations as the above (a) have been conducted and DLS thereof was measured.

The result of DLS measurement is illustrated in FIG. 5(B). The main peak appears at 85 nm and the smaller peak appears. PdI value is 0.17.

(c) First, under FRR=9 condition, the polymer solution and water were induced to the polymer solution supply flow passage Cp and the water system solution supply flow passage Cw to make 3000 μL/min of the total flow rate of the polymer solution and water, Qt=Qw+Qp, and other than that, the same operations as the above (a) have been conducted and DLS thereof was measured.

The result of DLS measurement is illustrated in FIG. 5(C). The main peak appears at 82 nm and the smaller peak appears. PdI value is 0.18.

Accordingly, miniaturization of nanoparticles barely took place by increasing the total flow quantity Qt of the solution.

Further, when the total flow quantity Qt of the solution increases, PdI value slightly increased and polydispersity level increased.

Example 2

Instead of the micro flow cell 1 referring to FIG. 1-3, the micro flow cell having the same confluent structure of flow passages but double turn number of the nanoparticle formation flow passage Cn structure is employed and other than that, the same operations as Example 1 have been conducted. FIG. 7(D) is a schematic view illustrating the flow passages of the micro flow cell.

Referring to Example 2, the width of flow passage of the micro flow cell is 700 μm; the flow passage length thereof is 612 mm; the flow capacity is 29 μL; and the turn number relative to the nanoparticle formation flow passage Cn in the downstream from the confluent section J is 28. Temperature of the flow passage of the micro flow cell was 25□.

(a) Firstly, under FRR=9 condition, the polymer solution and water were induced to the polymer solution supply flow passage Cp and two water system solution supply flow passage Cw1, Cw2 to make 1000 μL/min of the total flow rate of the polymer solution and water, Qt=Qw+Qp. The same operations as Example 1(a) were conducted and DLS measurement was conducted.

Figure 7A:
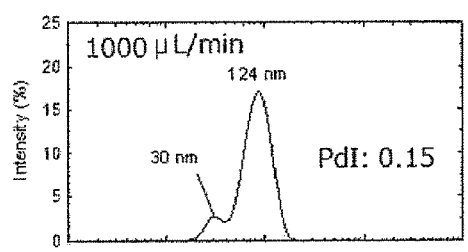
FIGS. 7(A), 7(B), 7(C) are graphs illustrating the DLS measurement result of Example 2.
Figure 7D:
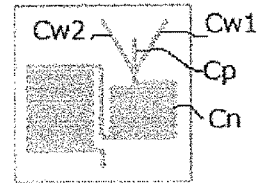
FIG. 7(D) is a diagram illustrating a flow passage of the micro flow cell of Example 2.

The result of DLS measurement is illustrated in FIG. 7(A). The main peak appears at 124 mn and the smaller peak appears at 30 nm. PdI value is 0.15.

(b) Next, under FRR=9 condition, the polymer solution and water were induced to the polymer solution supply flow passage Cp and two water system solution supply flow passages Cw1, Cw2 to make 2000 μL/min of the total flow rate of the polymer solution and water, Qt=Qw+Qp and other than that, the same operations as the above (a) have been conducted and DLS thereof was measured.

Figure 7B:
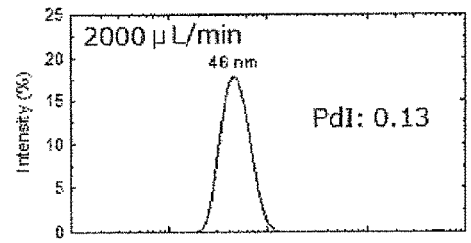

The result of DLS measurement is illustrated in FIG. 7(B). The main peak appears at 46 nm and obviously the single peak property was provided. PdI value is 0.13.

(c) Next, under FRR=9 condition, the polymer solution and water were induced to the polymer solution supply flow passage Cp and two water system solution supply flow passages Cw1, Cw2 to make 3000 μL/min of the total flow rate of the polymer solution and water, Qt=Qw+Qp and other than that, the same operations as the above (a) have been conducted and DLS thereof was measured.

Figure 7C:
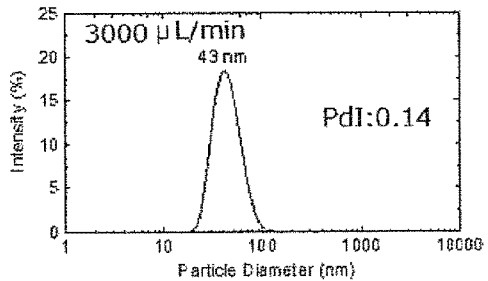

The result of DLS measurement is illustrated in FIG. 7(C). The main peak appears at 43 nm and obviously the single peak property was provided. PdI value is 0.14.

Accordingly, miniaturization of nanoparticles and providing the single peak property are achieved by increasing the total flow quantity Qt of the solution. Further, compared to Example 1, the confluence structure of the flow passages is confirmed as an important factor miniaturization of nanoparticle and single peak property therefor. The turn number of the nanoparticle formation flow passage Cn after confluence is not very important factor.

Comparison Example 2

Instead of the micro flow cell 1 referring to FIG. 1-3, the micro flow cell having Y structure relative to the confluent structure of flow passages as the same as Comparison Example 1 but double turn number of the nanoparticle formation flow passage Cn structure is employed and other than that, the same operations as Example 1 have been conducted. FIG. 8(D) is a schematic view illustrating the flow passages of the micro flow cell.

Referring to Comparison Example 2, the width of flow passage of the micro flow cell is 700 μm; the flow passage length thereof is 612 mm; the flow capacity is 28 μL; and the turn number relative to the nanoparticle formation flow passage Cn in the downstream from the confluent section J is 28. Temperature of the flow passage of the micro flow cell was 25□.

(a) First, under FRR=9 condition, the polymer solution and water were induced to the polymer solution supply flow passage Cp and the water system solution supply flow passage Cw to make 1000 μL/min of the total flow rate of the polymer solution and water, Qt=Qw+Qp, and other than that, the same operations as the above Example 1(a) have been conducted and DLS thereof was measured.

Figure 8A:
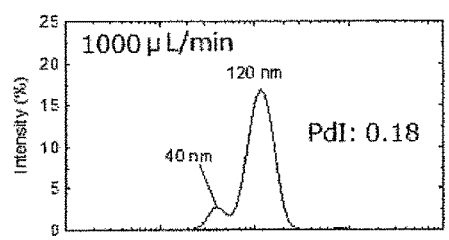
FIGS. 8(A), 8(B), 8(C) are graphs illustrating the DLS measurement result of Comparison Example 2.

The result of DLS measurement is illustrated in FIG. 8(A). The main peak appears at 120 nm and the smaller peak appears at 40 nm. PdI value is 0.18.

(b) First, under FRR=9 condition, the polymer solution and water were induced to the polymer solution supply flow passage Cp and the water system solution supply flow passage Cw to make 2000 μL/min of the total flow rate of the polymer solution and water, Qt=Qw+Qp, and other than that, the same operations as the above (a) have been conducted and DLS thereof was measured.

Figure 8B:
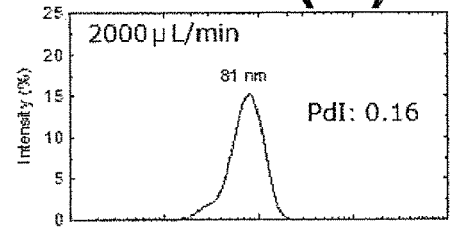

The result of DLS measurement is illustrated in FIG. 8(B). The main peak appears at 81 nm and the shoulder peak appears in the smaller peak area. PdI value is 0.16.

(c) First, under FRR=9 condition, the polymer solution and water were induced to the polymer solution supply flow passage Cp and the water system solution supply flow passage Cw to make 3000 μL/min of the total flow rate of the polymer solution and water, Qt=Qw+Qp, and other than that, the same operations as the above (a) have been conducted and DLS thereof was measured.

Figure 8C:
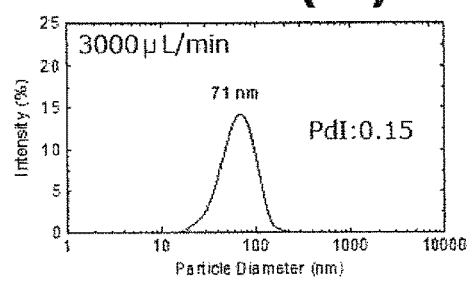
Figure 8D:
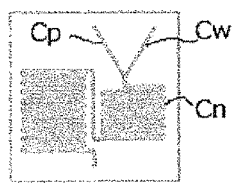
FIG. 8(D) is a diagram illustrating a flow passage of the micro flow cell of Comparison Example 2.

The result of DLS measurement is illustrated in FIG. 8(C). The main peak appears at 71 nm. PdI value is 0.15.

Accordingly, less miniaturization of nanoparticles took place compared to Example 2 by increasing the total flow quantity Qt of the solution.

Study of Fluidity in the Flow Passage Using Simulation
Confluent Structure Coinciding with Flow Passage of the Present Invention As set forth above, in the case of the coincident confluent structure of the flow passages, it is confirmed by Examples that miniaturization of nanoparticles and providing the single peak property are achieved by increasing the total flow quantity Qt of the solution. The inventor studied the results by simulation methodology. COMSOL Multiphysics 4.2a was employed for simulation and 2D simulation was conducted. A variety of parameters were input according to COMSOL Multiphysics 4.2a. The concentration of the polymer solution is 8 mg/mL and FRR=Qw/Qp=9 is set.

Figure 9A:
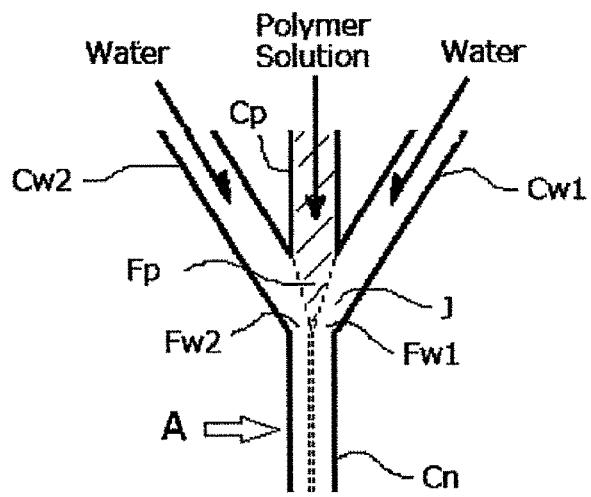
FIG. 9(a) is a view illustrating a simulation relative to the confluent structure of flow passages in FIG. 1 according to the present invention.
Figure 9B:
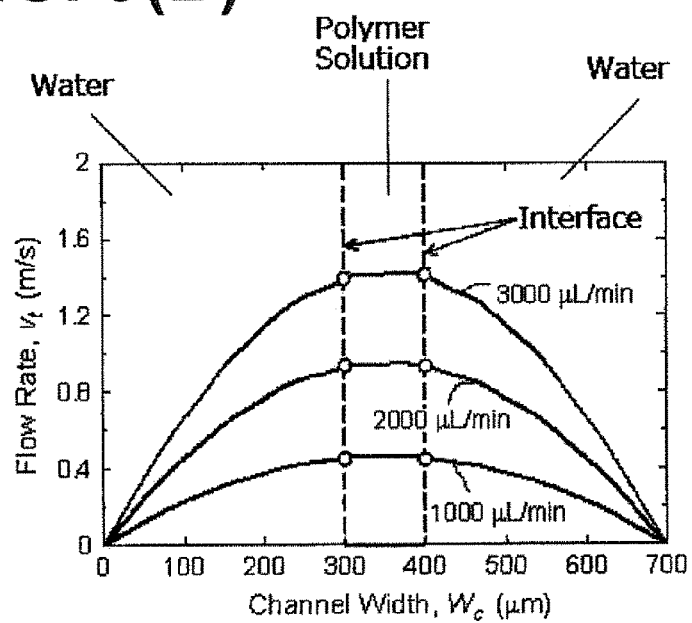
FIG. 9(B) is a graph illustrating the simulation result.

FIG. 9(A) is a view illustrating a simulation of the confluent structure of flow passages similar to FIG. 1 and so coincides with the present invention. FIG. 9(A) is basically the same as illustrated in FIG. 1 but for the details noted. The simulation was conducted as to the laminar flow Fp of the polymer solution and the flow rate of the laminar flows Fw1, Fw2 of the water system solution relative to the position of inner diameter width direction of the tube passage Cn near the location indicated by arrow A of the nanoparticle formation flow passage Cn in the downstream right from the confluent section J. FIG. 9(B) a graph illustrating the simulation result, the horizontal axis represents the position of inner diameter width direction [Channel Width, Wc (μm)] from the arrow A side of the inner diameter width direction of the tube passage Cn, and the perpendicular axis represents the laminar flow (flow) rate [Flow Rate, Vt (m/sec)] in the position of the width direction.

Referring further to FIG. 9(B), the flow rate of the laminar flow of the polymer solution at the interface between the laminar flow Fp of the polymer solution running in the center of the flow passage and the laminar flow Fw1, Fw2 of the water system solution increased from approximately 0.4 to approximately 0.8, approximately 1.4 times, following the increase of the total flow quantity Qt of the polymer solution and water from 1000 μL/min to 2000 μL/min and 3000 μL/min. Specifically, the simulation results indicate that the flow rate of the laminar flow Fp of the polymer solution increases because of running in the center of the flow passage Cn so that the area of the liquid-liquid boundary face in between the laminar flows Fw1, Fw2 of the water system solution surrounding the laminar flow Fp of the polymer solution may increase. The simulation results back up that the self-assembly of the amphiphilic block polymer is enhanced by an increase of the area of the liquid-liquid boundary face at the confluent section and an increase of the flow rate of the laminar flow of the polymer solution and nanoparticles having an uniform particle diameter are formed (i.e., the particle distribution provides single peak). The simulation results coincide with the results of Example 1, 2.

Confluent structure of Y-shape flow passages that does not meet the present invention is discussed herein.

Figure 10A:
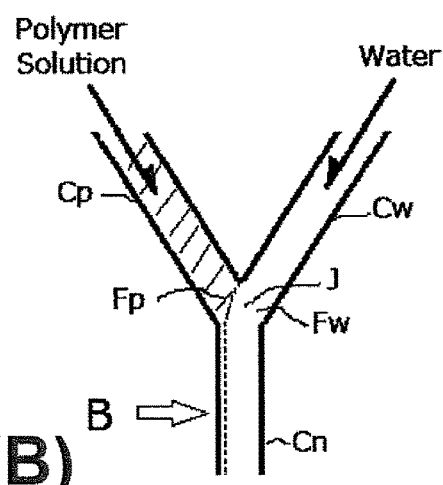
FIG. 10(A) is a view illustrating a simulation relative to the confluent structure of Y-shape flow passages in FIG. 6 disaccord with the present invention.
Figure 10B:
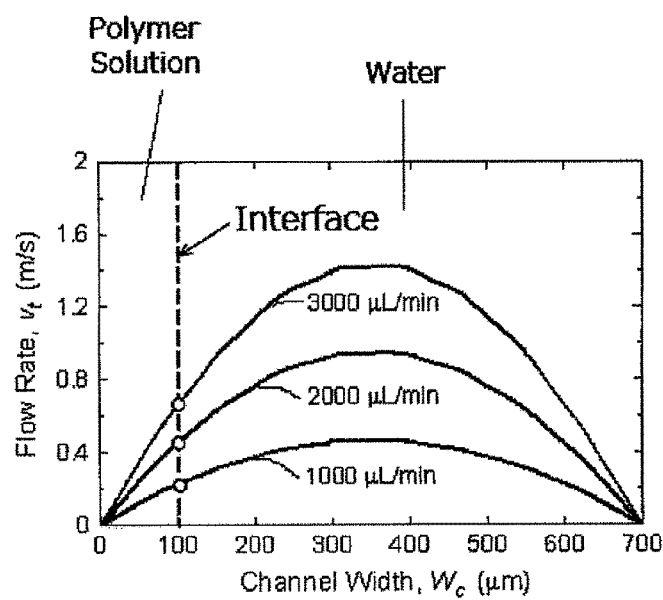
FIG. 10(B) is a graph illustrating the simulation result.

Here, FIG. 10(A) is a view illustrating a simulation relative to the confluent structure of Y-shape flow passages, which does not meet the present invention and is generally shown in FIG. 6 to further illustrate an option for the present invention. FIG. 10(A) is basically the same as illustrated in FIG. 6 but for the details noted therein. The simulation was conducted as to the laminar flow Fp of the polymer solution and the flow rate of the laminar flow of the water system solution relative to the position of inner diameter width direction of the tube passage Cn near the location indicated by arrow B of the nanoparticle formation flow passage Cn in the downstream right from the confluent section J. FIG. 10(B) a graph illustrating the simulation result, the horizontal axis represents the position of inner diameter width direction [Channel Width, Wc (μm)] from the arrow B side of the inner diameter width direction of the tube passage Cn, and the perpendicular axis represents the laminar flow (flow) rate [Flow Rate, Vt (m/sec)] in the position of the width direction.

Referring to FIG. 10(B), the flow rate of the laminar flow of the polymer solution at the interface between the laminar flow Fp of the polymer solution running in the inner wall side of the nanoparticle formation flow passage Cn and the laminar flow Fw of the water system solution increased only from approximately 0.2, approximately 0.4 to approximately 0.6, following even the increase of the total flow quantity Qt of the polymer solution and water from 1000 μL/min to 2000 μL/min and 3000 μL/min. Specifically, the simulation results indicate that the flow rate of the laminar flow Fp of the polymer solution increases because of running in the inner wall side of the flow passage Cn so that the flow rate slightly increases compared to running in the center of the flow passage Cn and the area of the liquid-liquid boundary face in between the laminar flow Fw of the water system solution surrounding the laminar flow Fp of the polymer solution might not increase. Accordingly, the simulation results back up that such confluent structure does not accelerate the self-assembly of the amphiphilic block polymer and the single peak property of the particle is inferior. The simulation results coincide with the results of Example 1, 2.

It will be understood that wherein the description herein discusses apparatus, features, or elements that are not discussed in explicit detail (e.g., 'controller' or 'heater' or 'PC' (see FIG. 2 for example), it will be understood by those of skill in this particular art that operative structures are necessarily understood to be operatively included therein by those of such skill. For example, the personal computer (PC) will be understood as containing all necessary components and features to operate as required as a computer, including process controllers, display screens, programming and computing systems including software code, memory devices, resistors, transistors, display screens, input and export apparatus, etc. all common in a computer without departing from the scope and spirit of the present invention. Similarly the controller or heater will be understood to contain features for controlling the flows, switches, and operational steps of the present devices and the heater is effective to control a temperature in the proposed system, the flow passages are bounded passages, and the valves and controllers are sufficient to operate as necessitated herein all without departing from the scope and spirit of the present invention as would be recognized by those of skill in the art. In a similar manner, it will be understood that the descriptive phrase 'nanoparticle' will be understood to be a small-sized particle typically and most usefully discussed in the nanometer (nm) scale. However, since depending upon the descriptive nomenclature and conversion factors used (millimeters (mm), microns ($\mu$), or nanometers (nm) maybe used interchangeably) an will be understood (with suitable conversions) by those of skill in the art within the scope and spirit of the present invention; similarly for units of volume (e.g., micro liters ($\mu$L)). Similarly such phrases may be used descriptively, e.g., 'nanoparticle flow passage' refers to the passage for the flow of the particles—not the dimension of the particular passage—although the particular passage may be very very small and also describable on a 'nanoparticle' type scale—such that no confusion would exist for one of skill in the art having studied the present disclosure.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

EXPLANATION OF REFERENCES

J Confluent section
Cp Polymer solution supply flow passage
Cw1, Cw2 Water system solution supply flow passage
Cn Nanoparticle formation flow passage
Fw1, Fw2 Laminar flow of water system solution
Fp Laminar flow of polymer solution

What is claimed is:
1. A method for manufacturing nanoparticles comprising an amphiphilic block polymer having a hydrophilic block and a hydrophobic block, comprising the steps of:
(a) providing a micro flow cell comprising
a polymer solution inlet;
a polymer solution supply flow passage operatively connecting to said polymer solution inlet;
at least two water system solution inlets;
at least two water system solution supply flow passages operatively connecting to each said water system solution inlet;
a confluent section, wherein said polymer solution supply flow passage is sandwiched by and is confluent with said at least two water system solution supply flow passages;
a nanoparticle forming flow passage in place in a downstream side of said confluent section; and
a nanoparticle inclusion solution outlet in a downstream end of said nanoparticle forming flow passage;
(b) introducing an amphiphilic block polymer inclusion solution into said polymer solution inlet and providing a laminar flow of said polymer solution to said confluent section through said polymer solution supply flow passage during a use;
(c) introducing a water system solution into said at least two water system solution inlets and providing at least two laminar flows of said water system solution to said confluent section through said at least two water system supply flow passages during said use;
(d) contacting said laminar flow of said polymer solution and said laminar flow of said water system solution with each other within said confluent section, forming a continuous confluent laminar flow wherein at least said two laminar flows of water system solution bound and sandwich the laminar flow of said polymer solution;
(e) thereby forming within said nanoparticle forming flow passage, nanoparticles comprising said amphiphilic block polymer; and
(f) obtaining a solution containing said formed nanoparticles from said nanoparticles inclusion solution outlet;
wherein the diameter of said laminar flow of said polymer solution in said confluent zone is about 100 $\mu$m, the flow rate of said laminar flow of said polymer solution is at least 2000 $\mu$L/min, and the nanoparticles are monodisperse with a polydispersity index of 0.14 or less.

2. The method for manufacturing, according to claim 1, wherein:
said micro flow cell further comprises;
a substrate;
a resin film that is in-place on said substrate, wherein said polymer solution supply flow passage, said at least two water system solution supply flow passage, said confluent section, and said nanoparticle formation flow passage are formed;
a cover sheet that is in-place on said resin film, wherein said polymer solution inlet is formed at the position corresponding to the upstream end of said polymer solution supply flow passage, said at least two water system solution inlets are formed at positions corresponding to respective upstream ends of said two water system solution supply flow passages, and forming said nanoparticles inclusion solution outlet at a position corresponding to the downstream end of said nanoparticle formation flow passage; and
said substrate and said resin film, and said resin film and said cover sheet are respectively operatively connected in a liquid-tight state during said use.

3. The method for manufacturing, according to claim 2, wherein:
said confluent section of said micro flow cell is formed at a location proximate a convergence of said two water system solution supply flow passages relative to said polymer solution supply flow passage;

said laminar flows of said water system solutions operative to sandwich said laminar flow of polymer solution from an opposing right side and an opposing left side relative the flow direction of said polymer solution and toward downstream side from the upperstream side at the downstream end of said polymer solution supply flow passage, whereby said polymer solution is uniformly bound by said laminar flow.

4. The method for manufacturing, according to claim 3, wherein:

said amphiphilic block polymer further comprises:

one of a hydrophilic block having one of alkylene oxide unit and a sarcosine unit and a hydrophobic block having hydroxy acid unit.

5. The method for manufacturing, according to claim 3, wherein:

said amphiphilic block polymer further comprises:

one of said hydrophilic block having a sarcosine unit and a hydrophobic block having lactic acid unit.

6. The method for manufacturing, according to claim 4, wherein:

the total sarcosine units included in said hydrophilic block are in the range of 2-300.

7. The method for manufacturing, according to claim 6, wherein:

the total lactic acid units included in said hydrophobic block are in the range of 5-400.

8. The method for manufacturing, according to claim 7, wherein:

respective particle diameters of said formed nanoparticles is in the range of 10-200 nm.

9. The method for manufacturing, according to claim 8, wherein:

a particle size distribution relative to the formed nanoparticles provides a single peak property.

10. The method for manufacturing, according to claim 9, further compromising:

in said polymer solution, at least one of a pharmaceutical agent, a labeling agent obtained by inclusion with the pharmaceutical agent, and a labeling agent.

11. The method for manufacturing, according to claim 9, further compromising:

in said water solution, at least one of a pharmaceutical agent, a labeling agent obtained by inclusion with the pharmaceutical agent, and a labeling agent.

12. The method for manufacturing, according to claim 5, wherein:

the total sarcosine units included in said hydrophilic block are in the range of 2-300.

13. The method for manufacturing, according to claim 12, wherein:

the total lactic acid units included in said hydrophobic block are in the range of 5-400.

14. The method for manufacturing, according to claim 13, wherein:

respective particle diameters of said formed nanoparticles is in the range of 10-200 nm.

15. The method for manufacturing, according to claim 14, wherein:

a particle size distribution relative to the formed nanoparticles provides a single peak property.

16. The method for manufacturing, according to claim 15, further compromising:

in said polymer solution, at least one of a pharmaceutical agent, a labeling agent obtained by inclusion with the pharmaceutical agent, and a labeling agent.

17. The method for manufacturing, according to claim 15, further compromising:

in said water solution, at least one of a pharmaceutical agent, a labeling agent obtained by inclusion with the pharmaceutical agent, and a labeling agent.

* * * * *